United States Patent
Mishra et al.

(10) Patent No.: US 12,074,773 B2
(45) Date of Patent: Aug. 27, 2024

(54) NETWORK VIEWPORT DATA FETCHING AND VISUALIZATION SYSTEM AND METHOD OF THE SAME

(71) Applicant: Rakuten Symphony Singapore Pte. Ltd., Singapore (SG)

(72) Inventors: Tarun Mishra, Indore (IN); Rahul Jain, Indore (IN); Vishal Parashar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/904,108

(22) PCT Filed: Jun. 23, 2022

(86) PCT No.: PCT/US2022/034648
§ 371 (c)(1),
(2) Date: Aug. 12, 2022

(87) PCT Pub. No.: WO2023/249629
PCT Pub. Date: Dec. 28, 2023

(65) Prior Publication Data
US 2024/0195704 A1    Jun. 13, 2024

(51) Int. Cl.
*H04L 41/22*     (2022.01)
*H04L 43/045*    (2022.01)

(52) U.S. Cl.
CPC ............ *H04L 41/22* (2013.01); *H04L 43/045* (2013.01)

(58) Field of Classification Search
CPC .............................. H04L 41/22; H04L 43/045
See application file for complete search history.

(56) References Cited

U.S. PATENT DOCUMENTS

| | | | |
|---|---|---|---|
| 11,900,393 B2* | 2/2024 | Ionescu | G06F 3/04847 |
| 2015/0261209 A1* | 9/2015 | Saitou | G05B 19/4097 |
| | | | 700/182 |
| 2020/0120097 A1* | 4/2020 | Amitay | H04L 63/101 |
| 2022/0067976 A1* | 3/2022 | Gershon | G06Q 10/087 |

* cited by examiner

*Primary Examiner* — El Hadji M Sall
(74) *Attorney, Agent, or Firm* — HAUPTMAN HAM, LLP

(57) ABSTRACT

A method of network viewport data fetching includes receiving a request at a mobile device to launch a network visualization application; causing a GUI to display of a viewport corresponding to a first geographic area and over the first geographic area one or more shapes; determining a latitude and longitude of a first and a second endpoint; determining a distance of a diagonal; determining a midpoint of the diagonal; in response to a distance between the midpoint and either the first or second endpoint being less than or equal to a threshold distance, updating to a second geographic area; or in response to the distance between the midpoint and either the first or second endpoint being greater than the threshold distance, updating the display of the viewport corresponding to a third geographic area and updating the one or more shapes that display the indication of network coverage quality.

20 Claims, 15 Drawing Sheets

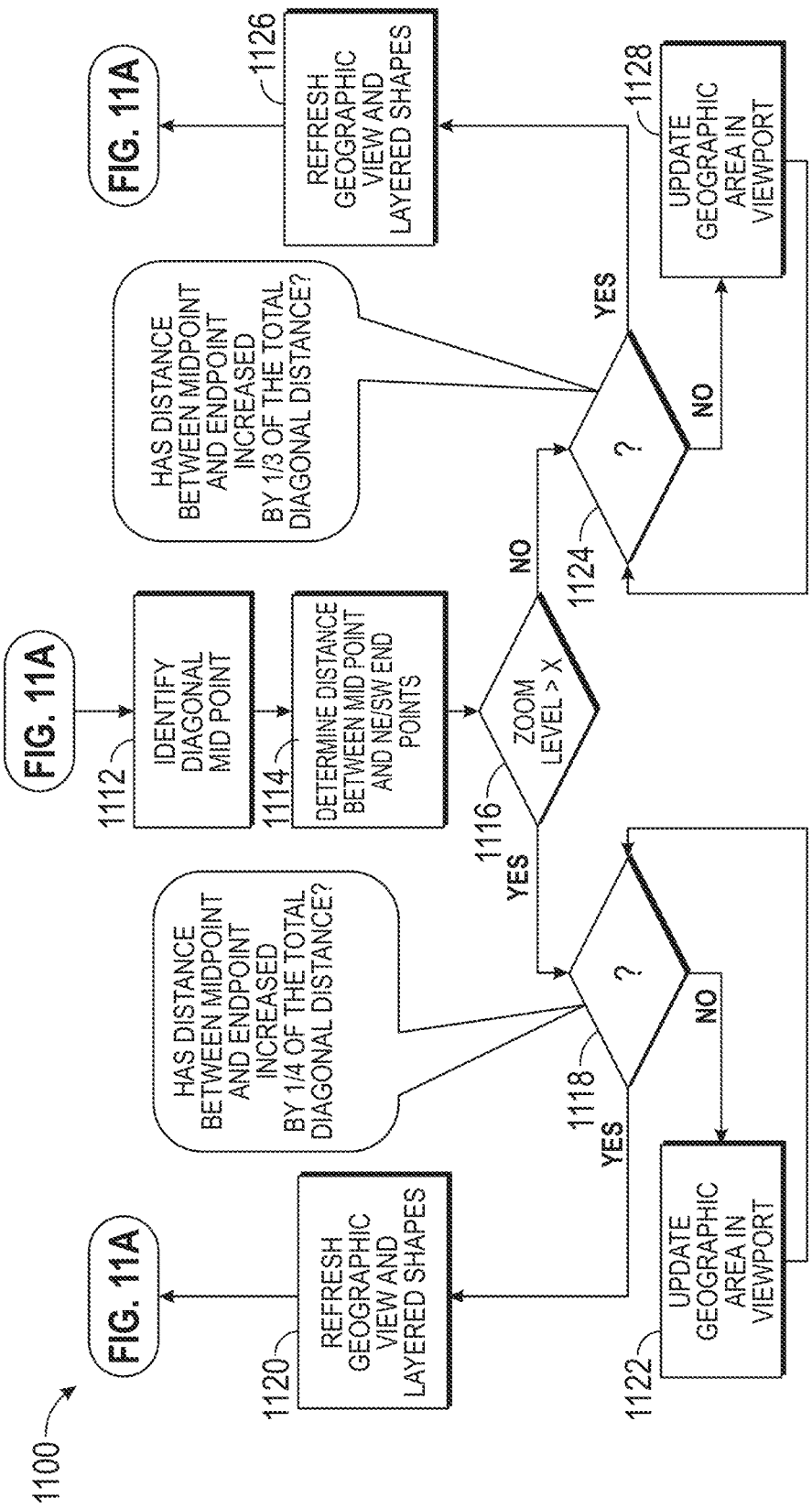

NETWORK VIEWPORT DATA FETCHING AND VISUALIZATION SYSTEM AND METHOD OF THE SAME

RELATED APPLICATIONS

The present application is a National Phase of International Application No. PCT/US2022/034648, filed Jun. 23, 2022.

TECHNICAL FIELD

This description relates to a network viewport data fetching and visualization system and method of using the same.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multichannel transceiver and antenna at the cell tower. Mobile devices within a cell communicate through that cell's antenna on multiple frequencies and on separate frequency channels assigned by the base station from a common pool of frequencies used by the cellular network.

A Radio Access Network (RAN) is part of the telecommunication system. The RAN implements radio access technology. RANs reside between devices such as a mobile phone, a computer, or any remotely controlled machine and provides connection with its Core Network (CN). Depending on the standard, mobile phones, and other wireless connected devices are varyingly known as User Equipment (UE), terminal equipment, Mobile Station (MS), and the like.

SUMMARY

In some embodiments, a method of network viewport data fetching includes receiving a request at a mobile device to launch a network visualization application; causing a graphical user interface (GUI) to be output by a user interface (UI), the GUI including a display of a viewport corresponding to a map of a first geographic area and layered over the first geographic area one or more shapes that display an indication of network coverage quality; determining a latitude and longitude of a first endpoint at a corner of the viewport and a second endpoint at an opposing corner of the viewport; determining a distance of a diagonal extending from the first endpoint to the second endpoint; determining a midpoint of the diagonal; in response to a distance between the midpoint and either the first or second endpoint being less than or equal to a threshold distance, updating the display of the viewport corresponding to a map of a second geographic area without updating the one or more shapes that display the indication of network coverage quality; or in response to the distance between the midpoint and either the first or second endpoint being greater than the threshold distance, updating the display of the viewport corresponding to a map of a third geographic area and updating the one or more shapes that display the indication of network coverage quality.

In some embodiments, an apparatus for network viewport data fetching includes a processor; and a memory having instructions stored thereon that, when executed by the processor, cause the apparatus to receive a request at a mobile device to launch a network visualization application; cause a graphical user interface (GUI) to be output by a user interface (UI), the GUI includes a display of a viewport corresponding to a map of a first geographic area and layered over the first geographic area one or more shapes that display an indication of network coverage quality; determine a latitude and longitude of a first endpoint at a corner of the viewport and a second endpoint at an opposing corner of the viewport; determine a distance of a diagonal extending from the first endpoint to the second endpoint; determine a midpoint of the diagonal; in response to a distance between the midpoint and either the first or second endpoint being less than or equal to a threshold distance, update the display of the viewport corresponding to a map of a second geographic area without updating the one or more shapes that display the indication of network coverage quality; or in response to the distance between the midpoint and either the first or second endpoint being greater than the threshold distance, update the display of the viewport corresponding to a map of a third geographic area and updating the one or more shapes that display the indication of network coverage quality.

In some embodiments, a non-transitory computer readable medium having instructions stored thereon that, when executed by a processor, cause an apparatus to receive a request at a mobile device to launch a network visualization application; cause a graphical user interface (GUI) to be output by a user interface (UI), the GUI including a display of a viewport corresponding to a map of a first geographic area and layered over the first geographic area one or more shapes that display an indication of network coverage quality; determine a latitude and longitude of a first endpoint at a corner of the viewport and a second endpoint at an opposing corner of the viewport; determine a distance of a diagonal extending from the first endpoint to the second endpoint; determine a midpoint of the diagonal; in response to a distance between the midpoint and either the first or second endpoint being less than or equal to a threshold distance, update the display of the viewport corresponding to a map of a second geographic area without updating the one or more shapes that display the indication of network coverage quality; or in response to the distance between the midpoint and either the first or second endpoint being greater than the threshold distance, update the display of the viewport corresponding to a map of a third geographic area and updating the one or more shapes that display the indication of network coverage quality.

BRIEF DESCRIPTION OF THE DRAWINGS

Aspects of the present disclosure are best understood from the following detailed description read with the accompanying FIGS. In accordance with the standard practice in the industry, various features are not drawn to scale. In fact, the dimensions of the various features are arbitrarily increased or reduced for clarity of discussion.

FIGS. 11A and 11B are flow diagram representations of a method 1100 for network viewport data fetching (NVDF), in accordance with some embodiments.

DETAILED DESCRIPTION

Figure 1:
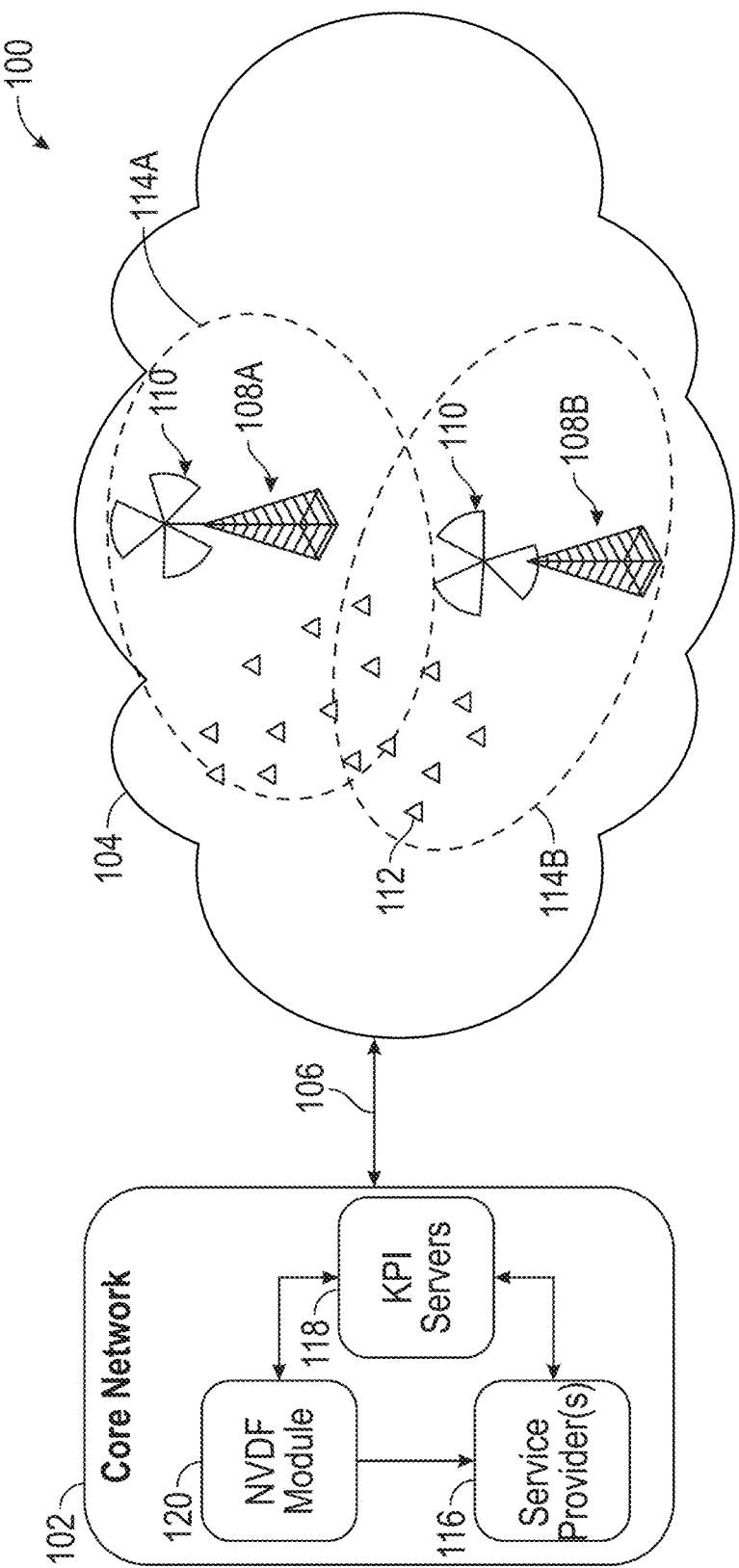
FIG. 1 is a diagrammatic representation of a network viewport data fetching system (NVDFS), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features be formed between the first and second features, such that the first and second features are unable to make direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a network viewport data fetching system (NVDFS) and method in accordance with embodiments are discussed in the present disclosure. Network sites (e.g., base stations, edge devices, or other suitable network devices within the scope of the present disclosure) are increasing day to day. In some embodiments, obtaining and displaying substantial amounts of data on a mobile application are difficult due to the amount of data to process (and the data increases as the network sites increase).

Coverage modules are used by network executives or service provider executives as they monitor their network statistics to ensure customer or subscriber satisfaction. In some embodiments, an executive is presented with this information upon opening a particular viewport map on a mobile device (e.g., user equipment UE). In some embodiments, when a user opens a network visualization application, the user checks stats based upon the view presented in a viewport.

A viewport is a polygon viewing region in computer graphics. In computer graphics theory, there are two region-like notions of relevance when rendering some objects to an image. In textbook terminology, the world coordinate window is the area of interest (meaning what the user wants to visualize) in some application-specific coordinates, e.g., miles, centimeters, or other suitable measurements within the scope of the present disclosure). The word window as used here is not confused with a graphics user interface (GUI) window. How a window limits what a user visualizes outside a room. In contrast, the viewport is an area (typically rectangular) expressed in rendering-device-specific coordinates, e.g., pixels for screen coordinates, in which the objects of interest are going to be rendered. Clipping to the world-coordinates window is usually applied to the objects before they are passed through the window-to-viewport transformation. When viewing a document in a web browser, the viewport is the region of the browser window which contains the visible portion of the document. In response to the size of the viewport changing, for example because of the user resizing the browser window, then the browser reflows the document (e.g., recalculates the locations and sizes of elements of the document). In response to the document being larger than the viewport, the user controls the portion of the document which is visible by scrolling in the viewport.

In some embodiments of the present disclosure the network visualization application is made more efficient for the user to analyze the network stats to obtain the data for a particular viewport. In some embodiments, efficient obtaining and execution of data provides for low data consumption, improved response of the user interface (UI) while processing lower amounts of data, improving the data lag, improving fetching of data from a server, improving viewport site (base stations, edge devices) count updates, and improving viewport network statics.

In some embodiments, a mapping library is used to obtain map parameters, such as displaying a relevant map, extraction of latitude and longitude information, and obtaining the distance between viewport diagonal edges and a viewport midpoint (as will be discussed in greater detail below).

In some embodiments, a NVDFS and method are implemented on many varying platforms, such as 3rd Generation Partnership Project (3GPP), Open Radio Access Network (O-RAN), and cloud native computing (CNC).

The 3GPP is an umbrella term for several standards organizations which develop protocols for mobile telecommunications. 3GPP is known for the development and maintenance of the global system for mobile communications (GSM) and related 2G and 2.5G standards, including general packet radio service (GPRS) and enhanced data rates for GSM evolution (EDGE), universal mobile telecommunications system (UMTS) and related 3G standards, including high-speed packet access (HSPA) and HSPA+, long term evolution (LTE) and related 4G standards, including LTE Advanced and LTE Advanced Pro, 5G new radio (NR) and related 5G standards, including 5G-Advanced. The 3GPP organizes work into three different streams: Radio Access Networks, Services and Systems Aspects, and Core Network and Terminals.

O-RAN is a concept based on interoperability and standardization of RAN elements including a unified interconnection standard for white-box hardware and open-source software elements from different vendors. O-RAN architecture integrates a modular base station software stack on off-the-shelf (OTS) hardware which allows baseband and radio unit components from discrete suppliers to operate seamlessly together.

CNC is an approach in software development that utilizes cloud computing to build and run scalable applications in modern, dynamic environments such as public, private, and hybrid clouds. Technologies such as containers, microservices, serverless functions and immutable infrastructure, deployed via declarative code are common elements of this architectural style. CNC techniques enable loosely coupled systems that are resilient, manageable, and observable. Combined with robust automation, CNC allows engineers to make high-impact changes frequently and predictably with minimal toil. Frequently, cloud-native applications are built as a set of microservices that run in Docker containers and may be orchestrated in Kubernetes and managed and deployed using DevOps and Git CI workflows (although there is a large amount of competing open source that supports cloud-native development). The advantage of using Docker containers is the ability to package all software needed to execute into one executable package. The container runs in a virtualized environment, which isolates the contained application from its environment.

FIG. 1 is a diagrammatic representation of a network visualization (NV) system 100, in accordance with some embodiments.

NVDFS 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and NVDF module 120.

CN 102 (also known as a backbone) is a part of a computer network which interconnects networks, providing a path for the exchange of information between different Local Area Networks (LANs) or subnetworks. In some embodiments, CN 102 ties together diverse networks over wide geographic areas, in different buildings in a campus environment, or in the same building.

In some embodiments, RAN 104 is a GSM RAN, a GSM/EDGE RAN, a UMTS RAN (UTRAN), an E-UTRAN, Open RAN (O-RAN), virtual RAN (v-Ran), or a Cloud-RAN (C-RAN). RAN 104 resides between user equipment 112 (e.g., mobile phone, a computer, or any remotely controlled machine) and CN 102. RAN 104 is shown as a C-RAN for purposes of simplified representation and discussion. In some embodiments, Base Band Units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of NVDFS 100 comprises the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. The connection between base station 108 and UE 112 begins with backhaul 106 connected to CN 102. In some embodiments, backhaul 106 includes wired, fiber optic and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a Remote Radio Head (RRH), primary and backup electrical power sources, and sheltering. Base stations are known by other names such as base transceiver station, mobile phone mast, or cell tower. In some embodiments, base stations are replaced or used in cooperatively with edge devices configured to wirelessly communicate with UEs. The edge device provides an entry point into service provider CNs, such as CN 102. Examples include routers, routing switches, Integrated Access Devices (IADs), multiplexers, and a variety of Metropolitan Area Network (MAN) and Wide Area Network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or Ultra-High Frequency (UHF) frequencies (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 112 are a computer or computing system. Additionally, or alternatively, UEs 112 have a Liquid Crystal Display (LCD), Light-Emitting Diode (LED) or Organic Light-Emitting Diode (OLED) screen interface providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run Operating Systems (OS) that allow third-party apps specialized for capabilities to be installed and run. In some embodiments, UEs 112 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 114 are of any shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal. Coverage gaps are caused by most anything such as faulty equipment, bad weather, animals, accidents, and the like. Coverage gaps occur through the loss of one or more sets of transmitters, receivers, transceivers, digital signal processors, control electronics, GPS receivers, primary and backup electrical power sources, and antennas. Additionally, or alternatively, coverage gaps exist because of areas never previously covered by cellular service or created by removal of a base station or the like. In some embodiments, coverage gaps develop after the service covering an area is lost for any reason. In other examples, a coverage gap is any area without any cell coverage service to UE for whatever reason.

Service provider(s) 116 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (Minimization of Drive Test) traces, and crowdsourced data) allows for modelling of network traffic, hot-spot identification, and radio signal propagation. RF drive testing is a method of measuring and assessing the coverage, capacity, and Quality of Service (QOS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber would experience in any specific area, wireless carriers make directed changes to their networks that provide better coverage and service to their customers. Drive testing commonly is configured with a mobile vehicle outfitted with drive testing measurement equipment. The equipment is usually highly specialized electronic devices that interface to Original Equipment Manufacturer (OEM) mobile handsets (UEs). This ensures measurements are realistic and comparable to actual user experiences.

UE/cell/MDT traces collected at the Operations Support Systems (OSS) or through dedicated tools provide service provider(s) 116 with user-level information. Once geolocated, UE/cell/MDT traces are used to enhance path-loss calculations and prediction plots, as well as to identify and locate problem areas and traffic hotspots. KPI servers 118 allow service provider(s) 116 to use UE/cell/MDT traces along with NVDF module 120 for network visualization.

In some embodiments, NVDF module 120 gathers the Reference Signal Received Power (RSRP). RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns). In some embodiments, the RSRP is obtained from KPI servers 118.

In some embodiments, NVDF module 120 gathers the Synchronization Signal reference signal received power (SS-RSRP). SS-RSRP is defined as the linear average over the power contributions (in Watts) of the resource elements that carry secondary synchronization signal (SSS). SS-RSRP is the linear average of the received SSS level. The synchronization signals, which are specific to each cell, are transmitted using the source elements. RSRP makes possible the comparison of the strengths of signals from individual cells in 5G networks. RSRP is a parameter for cell selection or handover. SS-RSRP is the equivalent of the RSRP parameter used in LTE systems.

In some embodiments, NVDF module 120 gathers the Signal-to-Interference-plus-Noise Ratio (SINR) that is a quantity used to give theoretical upper bounds on channel capacity (or the rate of information transfer) in wireless communication systems. Analogous to the Signal-to-Noise Ratio (SNR) used often in wired communications systems, the SINR is defined as the power of a certain signal of interest divided by the sum of the interference power (from the other interfering signals) and the power of some background noise.

In some embodiments, NVDF module 120 gathers the synchronization signal Signal-to-Interference-plus-Noise Ratio (SS-SINR) which is the linear average over the power contribution (in Watts) of the resource elements carrying SSS divided by the linear average of the noise and interference power contribution (in Watts) over the resource elements carrying SSS within the same frequency bandwidth. SS-SINR is the linear average over the power contribution of the resource elements carrying secondary synchronization signals divided by the linear average of the noise and interference power contribution over the resource elements carrying secondary synchronization signals within the same frequency bandwidth (i.e., ETSI TS 138 215 V15.2.0 herein incorporated by reference in entirety). In LTE networks SINR reported as a code via measurement report to eNodeB (e.g., access point). This is a difference between 3G and 4G.

In some embodiments, NVDF module 120 gathers data throughput. When used in the context of communication networks, such as Ethernet or packet radio, throughput or network throughput is the rate of successful message delivery over a communication channel. The data these messages belong to are delivered over a physical or logical link or pass through a certain network node. Throughput is usually measured in bits per second (bit/s or bps), and sometimes in data packets per second (p/s or pps) or data packets per time slot. Throughputs include downlink and uplink data transmission. The radio downlink is the transmission path from a cell site to the UE. The radio uplink is the transmission path from the mobile station (UE) to a base station.

In some embodiments, NVDF module 120 gathers information regarding latency. Network delay is a design and performance characteristic of a telecommunications network. Network delay specifies the latency for a bit of data to travel across the network from one communication endpoint to another. Latency is typically measured in multiples or fractions of a second. Delay differs slightly, depending on the location of the specific pair of communicating endpoints. Engineers usually report both the maximum and average delay, and they divide the delay into several parts: (1) such as processing delay which is the time a router takes to process the packet header; (2) queuing delay which is the time the packet spends in routing queues; (3) transmission delay which is the time taken to push the packet's bits onto the link; (4) propagation delay which is the time for a signal to propagate through the media. A certain minimum level of delay is experienced by signals due to the time it takes to transmit a packet serially through a link. This delay is extended by more variable levels of delay due to network congestion. IP network delays range from a few milliseconds to several hundred milliseconds.

In some embodiments, NVDF module 120 gathers information from layer-three (network layer) drives. The network layer is responsible for receiving frames from the data link layer and delivering them to their intended destinations based on the addresses contained inside the frame. The network layer finds the destination by using logical addresses, such as IP (internet protocol). At this layer, routers are a component used to route information where it needs to go between networks.

In some embodiments, NVDF module 120 gathers information from a consumer on the network, such as RAN 104. NVDF module 120 gathers active and passive connectivity (e.g., reachability). In some embodiments, NVDF module 120 gathers information from web performance test (WPT; NVDF module 120 captures signal KPIs during the execution of WPT and uses the signal KPIs for the creation of shaped layer presentations on a map), YouTube, network drive, feedback, and 1C drive information. In some embodiments, NVDF module 120 collects active and passive data from subscribers and/or users. In a non-limiting example, network quality, related parameters, SINR, RSRP, data throughput, and other suitable parameters within the scope of the disclosure.

Figure 13:
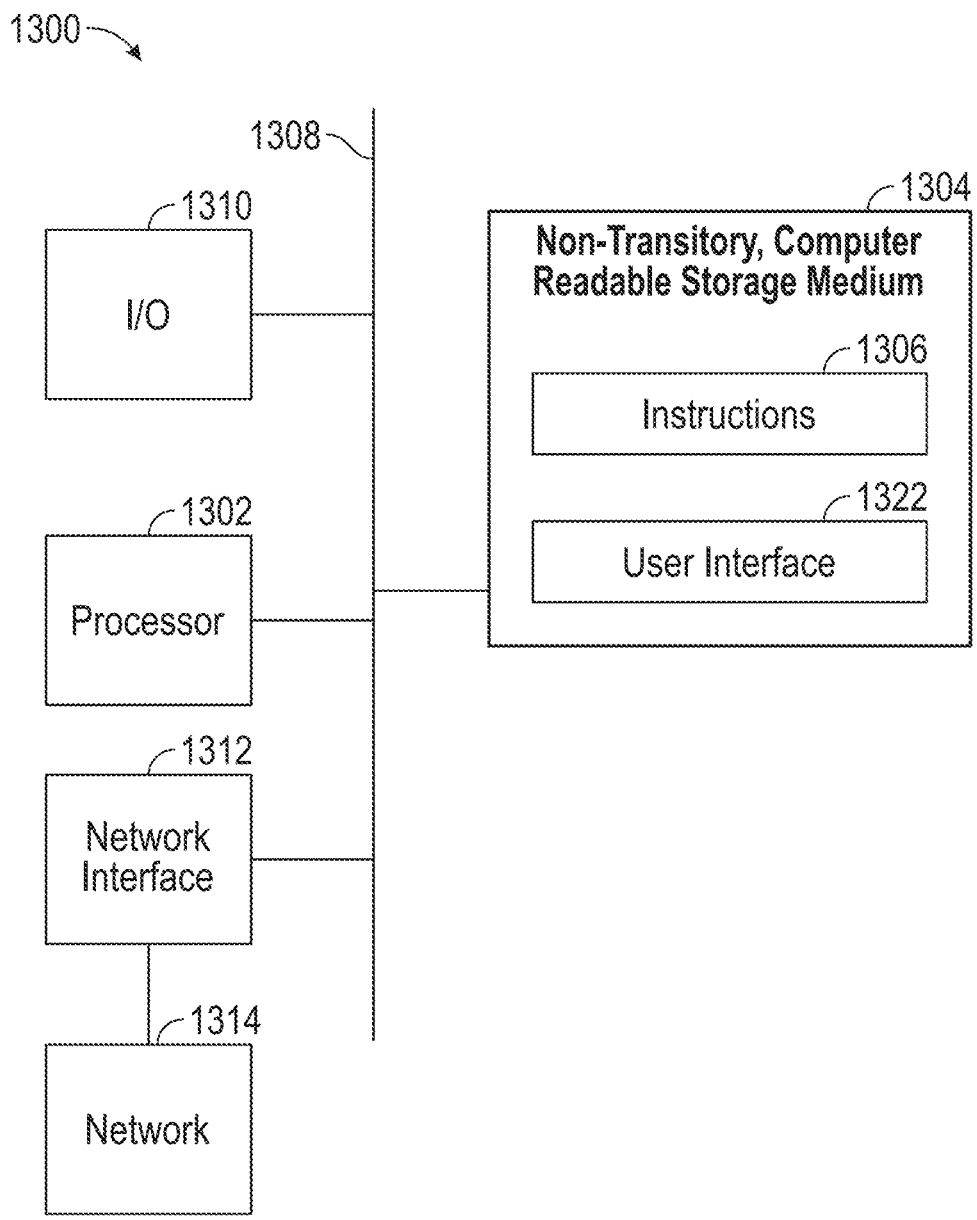
FIG. 13 is a high-level functional block diagram of a processor-based system, in accordance with some embodiments.

In some embodiments, NVDF module 120 gathers geo-located KPI sample data. In some embodiments, this geo-located data is provided by KPI servers 118. In some embodiments, the geo-located sample data is provided by a database or memory, such as memory 1304 (FIG. 13). In some embodiments, the geo-located data includes serving ENodeB ID (i.e., the identifier of the node at the base station). In some embodiments, the geo-located data is provided and/or collected through drive testing, UE KPIs reported by the UE, such as UEs 112, base station KPI reporting through Central Units (CU) or Distribution Units (DU) associated with a base station, such as base stations 108, or other suitable methods of collecting geo-located data in accordance with some embodiments. For the purposes of discussion, each device providing KPI information is referred to herein as a node (e.g., antenna, edge devices, UEs, or other suitable devices within embodiments of the present disclosure).

In some embodiments, NVDF module 120 gathers the Physical Cell ID (PCI). PCI used to indicate the physical layer identity of a cell. The PCI is used for cell identity during cell selection procedure. The purpose of PCI optimization is to ensure to a great extent that neighboring cells have different primary sequences allocated. Good PCI assignment reduces call drops by enabling UE to clearly distinguish one cell from another.

In some embodiments, NVDF module 120 gathers the latitude and longitude of the node (e.g., gNB), NAP, base station 108, or edge device through a location tag.

In some embodiments, NVDF module 120 geo bins the collected data. As the data collection occurs, NVDF module 120 performs a binning operation on the collected data. In some embodiments, NVDF module 120 obtains the mean of all the values in a predetermined region. In some embodiments, NVDF module 120 determines the edges (e.g., NW, SW, NE & SE) of a geographic area, divides the geographic area into a shape, such as hexagons, looks up values within each shape, computes an average (mean), and attributes the mean to the latitude and longitude at the center of the shape.

Figure 2:
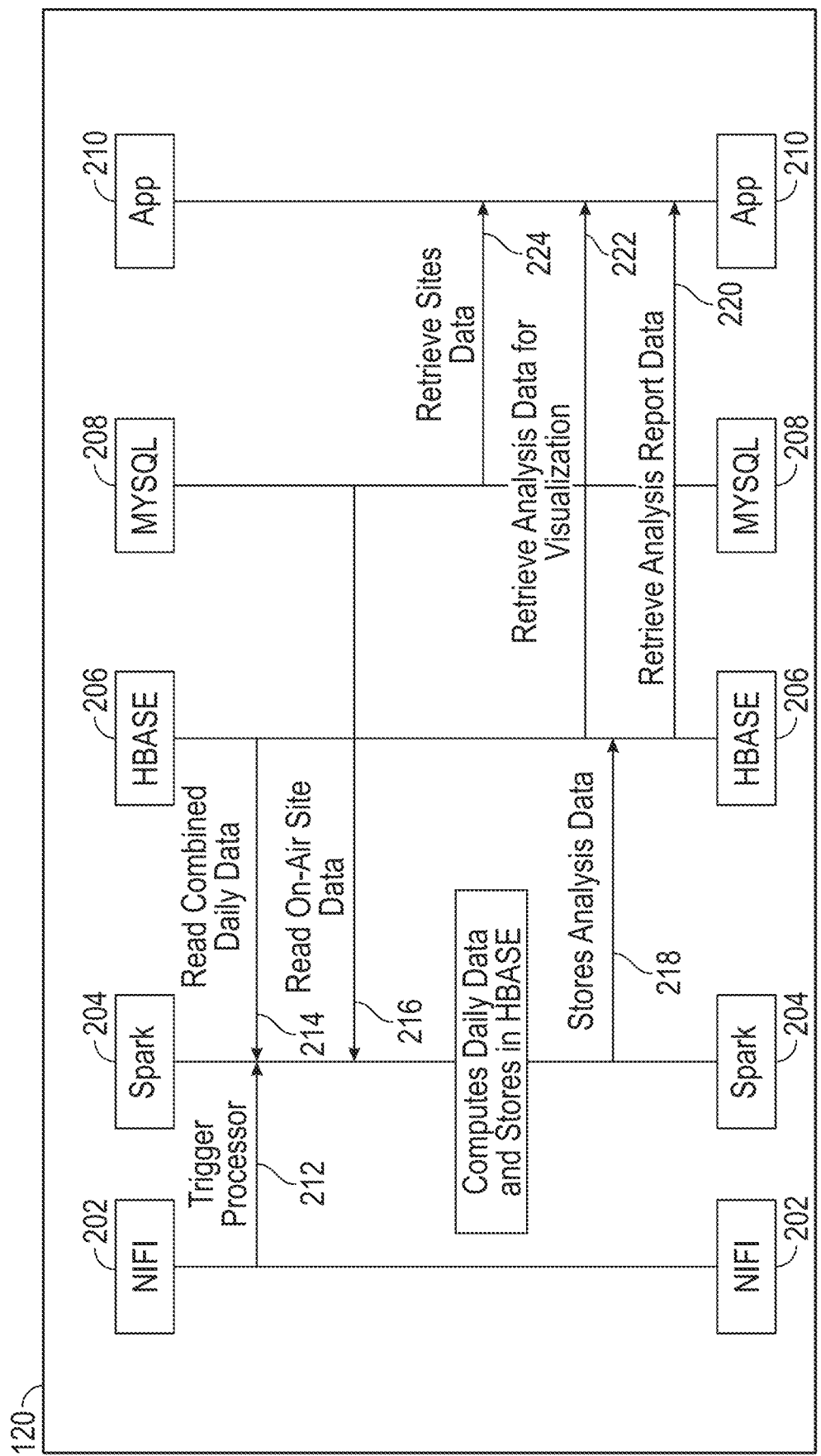
FIG. 2 is a data flow diagram of a NVDF module, in accordance with some embodiments.

FIG. 2 is a data flow diagram of a NVDF module 120, in accordance with some embodiments.

NVDF module 120 includes a NIFI component 202, a Spark component 204, an Hbase-component 206, a MySQL component 208, and an Application component 210.

In some embodiments, NIFI-component 202 automates the flow of data between NVDF module 120 and KPI servers 118. NIFI-component 202 ingests data from third party applications, the data including latitude and longitude for each base station, such as base station 108, frequency band details, eNB ID, evolved-UTRAN cell global identifier (ECGI), drive test data, KPIs, consumer data and other suitable data in accordance with some embodiments. In some embodiments, NIFI-component 202 is an open-source platform based on the concept of extract, transform, and load. The software design is based on the flow-based programming model and offers features that include the ability to operate within clusters, security using Transport Layer Security (TLS) encryption, extensibility (e.g., users can write their own software to extend its abilities) and improved usability features like a portal which is used to view and modify behavior visually. NIFI-component 202 is used to schedule jobs, trigger flow, and ingest data from third-party applications like raw files from KPI servers 118.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

Hbase-component 206 provides a fault-tolerant way of storing large quantities of sparse data (e.g., small amounts of information caught within a large collection of empty or unimportant data). Hbase-component 206 is a column-oriented non-relational database management system that runs on top of a Hadoop Distributed File System (HDFS). HBase provides a fault-tolerant way of storing sparse data sets, which are common in many big data use cases.

HDFS-component (not shown) is a distributed filesystem that stores data on commodity machines, providing very high aggregate bandwidth across server clusters. All batched data sources are initially stored into HDFS-component and then processed using Spark-component 204. Hbase-component 206 also utilizes HDFS as its data storage infrastructure.

MySQL-component 208 is an open-source Relational Database Management System (RDBMS). A relational database organizes data into one or more data tables in which data types are related to each other and these relations help structure the data. MySQL component 208 creates, modifies, and extracts data from Spark-component 204 at operation 216, as well as controls user access. MySQL-component 208 is utilized for Application Programming Interface (API) retrieval and for serving any real-time User Interface (UI), such as UI 1322 (FIG. 13). The aggregated and correlated data is also stored in MySQL.

Figure 6A:
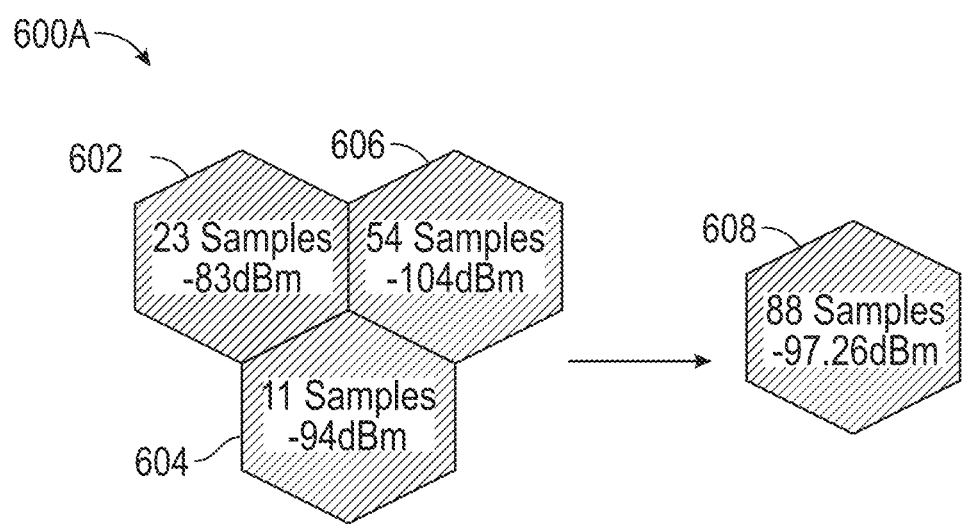
FIG. 6A is a pictorial representation of aggregation of multiple shapes, in accordance with some embodiments.
Figures 6B, 6C, 6D:
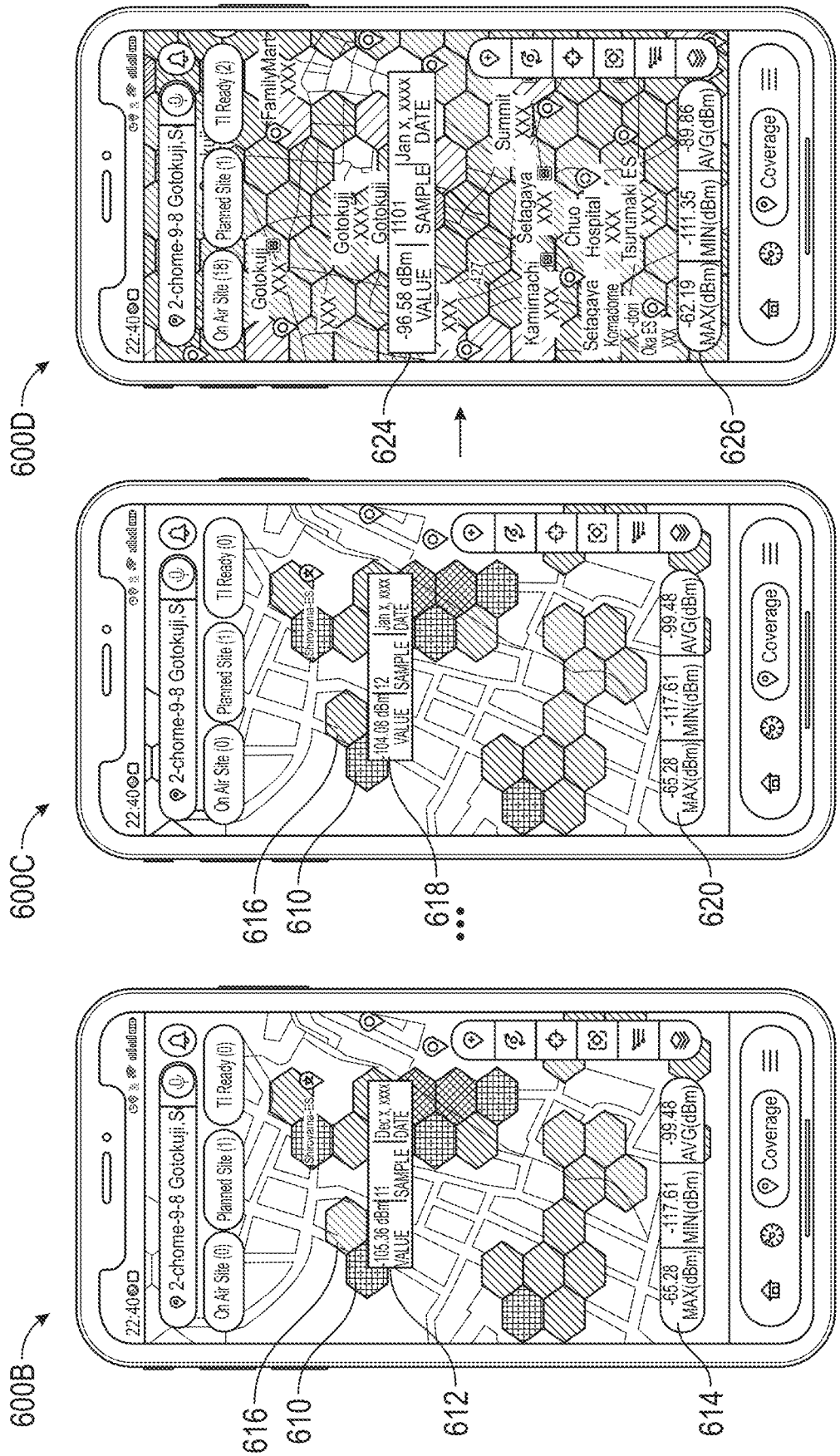
FIGS. 6B, 6C, and 6D are pictorial representations of user equipment user interfaces, in accordance with some embodiments.

Application component 210 allows a user, through a UI such as UI 1322 of FIG. 13 or a UI of a UE (as shown in FIGS. 6B, 6C, and 6D), to visualize the network (e.g., retrieve analysis data for visualization) at operation 222. A user visualizes varying aspects of the NV in real time including analysis report data at operation 220. In some embodiments, a user visualizes specified bands and varying geographic areas. In some embodiments, a user visualizes individual shapes (e.g., hexagonal geographic areas) based on network analysis. For example, a user determines whether a geographic area (represented by a shape layered over a map) is experiencing poor coverage.

In some embodiments, a user drills down into details within a shape. In some embodiments, a user hovers over or clicks on a layered shape and a pop-up box reveals information such as cell ID, cell RSRP, cell SS-RSRP, cell SINR, and the number of samples collected within the grid. In some embodiments, a user visualizes details regarding network performance in each layered shape. For example, the user visualizes in a pop-up box a layered shape RSRP, and the number of sample counts for the layered shape.

At operation 212, spark component 204 retrieves third party data from NIFI component 202. In some embodiments, the inputted third-party data includes site information from a site database, such as a latitude and longitude of all cells in a RAN, frequency band details, eNB ID, ECGI, and other suitable information. In some embodiments, the inputted data additionally includes geo-located data, such as RF drive testing information, UE KPI data or other passively collected data. In some embodiments, the geo-located data is collected over a continually running window of time, such as 24 hours. In some embodiments, the geo-located data is collected over greater than 24 hours and in some embodiments the geo-located data is collected over less than 24 hours. In some embodiments, the window of time for collection of geo-located data is controlled by a sliding window algorithm. In some embodiments, the collected data is collected in a FIFO (First In, First Out) manner whereas new data is collected older data is removed (e.g., data greater than 24 hours old).

Spark component 204 stores the geo-located data in Hbase component 206 and retrieves the stored data at operation 214 to perform a network analysis. At operation 218, Spark component 204 stores the network analysis in Hbase component 206. Continuing with operation 216, MySQL 208 retrieves site information from Spark component 204 and combines the site information for Application 210. Application 210, at operation 222, retrieves the network analysis data from Hbase component 206 for visualization. Application component 210 further retrieves network analysis report data at operation 220 for visualization.

Figure 3:
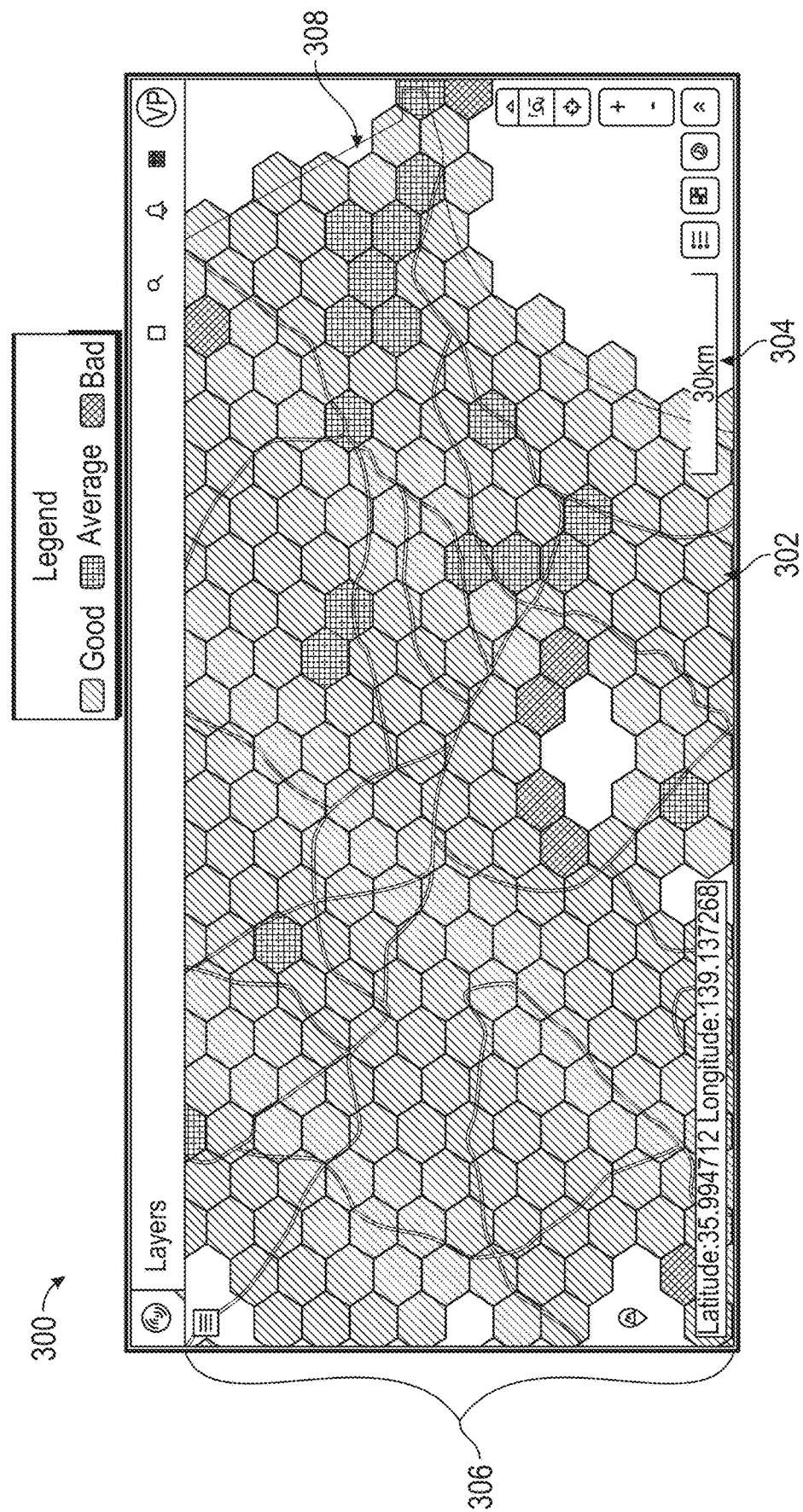
FIG. 3 is a pictorial representation of a network visualization geographic area, in accordance with some embodiments.

FIG. 3 is a pictorial representation of a network visualization geographic area 300, in accordance with some embodiments.

Network visualization geographic area 300 is a representation of the collected data presented by the application discussed above. Network visualization geographic area 300 is divided into hexagons 302 where, in some embodiments, each hexagon 302 represents a geographic area based on scale 304 of network visualization geographic area 300. Network visualization geographic area 300, including hexagons 302, are layered over map 308, which represents a geographic area of interest. In some embodiments, the hexagons 302 combine to form a grid 306. In some embodiments, hexagons 302 are configured with varying sizes and provide information relating to network coverage quality (e.g., as good, average, or bad). In some embodiments, the size of grids 302 are adjustable by an engineer or user. In some embodiments, grids 302 have varying shapes including circular, square, rectangular. In some embodiments, a user selects a shape of grids 302. In some embodiments, the area of hexagons 302 are based on a level of zoom into network visualization geographic area 300. In table 1 below, the area of hexagons 302 is adjusted based on a zoom level. Continuing with the example of table 1, a pixel grid size is also adjusted for resolution of details within hexagon 302. In some embodiments, as the zoom level increases, the area of the hexagon 302 decreases. In some embodiments, increasing the zoom level, increases the number of pixels in the representation while the hexagon area remains the same. Thus, providing greater visual clarity without increasing the area of hexagon 302.

TABLE 1

| Zoom Level | Area of Hexagon | Grid size in pixels |
| --- | --- | --- |
| 4 | 140 km$^2$ | 24 |
| 5 | 140 km$^2$ | 48 |
| 6 | 120 km$^2$ | 24 |
| 7 | 120 km$^2$ | 48 |
| 8 | 100 km$^2$ | 24 |
| 9 | 100 km$^2$ | 48 |
| 10 | 80 km$^2$ | 24 |
| 11 | 80 km$^2$ | 48 |
| 12 | 60 km$^2$ | 24 |
| 13 | 60 km$^2$ | 48 |
| 14 | 40 km$^2$ | 24 |
| 15 | 40 km$^2$ | 48 |
| 16 | 2.5 km$^2$ | 24 |
| 17 | 2.5 km$^2$ | 48 |

Figure 4:
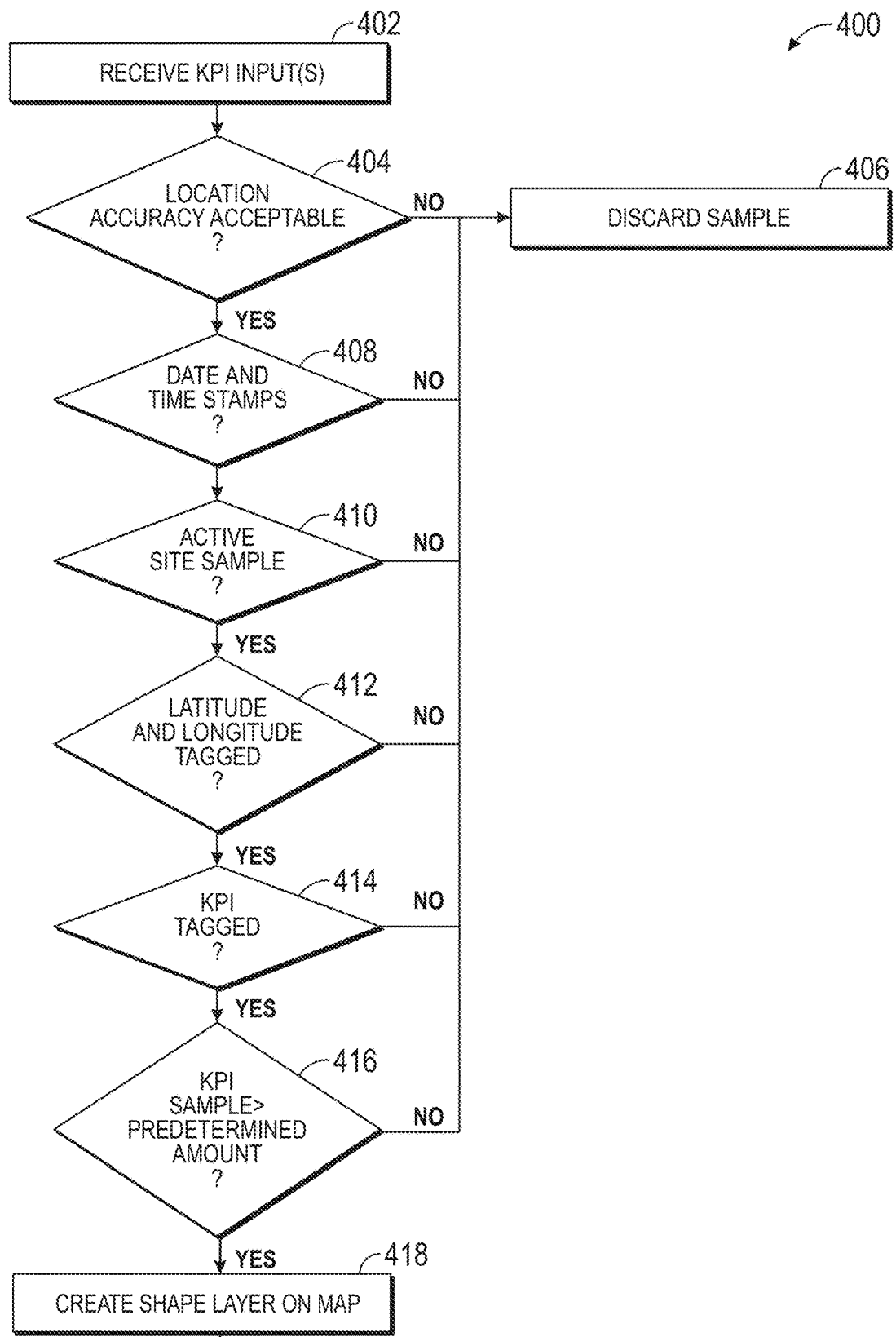
FIG. 4 is a flow diagram representation of a method for network visualization, in accordance with some embodiments.

FIG. 4 is a flow diagram representation of a method 400 for network visualization (NV), in accordance with some embodiments.

While the operations of method 400 are discussed and shown as having a particular order, each operation in method 400 is configured to be performed in any order unless specifically called out otherwise. Method 400 is implemented as a set of operations, such as operations 402 through 418.

At operation 402 of method 400, KPI data inputs are received. In some embodiments, NIFI component 202 gathers geo-located KPI samples that include serving eNB IDs, NR EARFCNs, PCIs, cell latitude and longitude, cell RSRP, cell SS-RSRP, SINR, SS-SINR, data throughput, latency, layer-three drive data, UE KPIs, and other suitable geo-located samples in accordance with some embodiments. Operational flow moves from operation 402 to operation 404, where location accuracy is determined.

In operation 404 of method 400, a determination is made as to the location accuracy of the received KPI data samples. In some embodiments, location accuracy is determined based upon a known location of a cell, antenna, UE, or other suitable KPI producing node in embodiments of the present disclosure. In some embodiments, the location accuracy of the KPI data samples is within a threshold (e.g., less than 5 meters) to be acceptable. In some embodiments, in response to the accuracy of the KPI location data being greater than the threshold of known node location data, the KPI location data is not used for network visualization. In response to the location accuracy of a sample being unreliable ("NO" branch of block 404), process flows to operation 406 where the sample is discarded. In response to the location accuracy of a sample being acceptable ("YES" block of operation 404), operation proceeds from operation 404 to operation 408.

In operation 408 of method 400, a determination is made as to whether the data sample has date and time stamps. In some embodiments, KPIs rely on a time stamp as part of their calculation. As part of the check for changed data, the time stamp is also considered. In response to the KPI data sample having no date and/or time stamp ("NO" branch of block 408), process flows to operation 406 where the sample is discarded. In response to the data sample including a date and time stamp ("YES" branch of block 408), operation proceeds from operation 408 to operation 410.

In operation 410 of method 400, a determination is made as to whether the KPI data sample originates from a non-outage node (e.g., an active edge device or base station). In response to the data sample originating from an outage site ("NO" branch of block 410), process flows to operation 406 where the sample is discarded. In response to the data sample originating from an active node ("YES" branch of block 410), operation proceeds from operation 410 to operation 412.

In operation 412 of method 400, a determination is made as to whether the KPI data sample contains a latitude and longitude tag. Geo-tagging is the process of adding geographic information about KPI data, within tags—including latitude and longitude coordinates, place names and/or other positional data. In response to the data sample not having a latitude and longitude tag ("NO" branch of block 412), process flows to operation 406 where the sample is discarded. In response to the data sample including a latitude and longitude tag ("YES" branch of block 412), operation proceeds from operation 410 to operation 412.

In operation 414 of method 400, a determination is made as to whether the data sample KPI is tagged. KPI tags are an abbreviated title with a KPI value. Each KPI has a data source, entity set, and annotation file. The KPI value changes only in response to an action executed on transactional content. In response to the KPI sample not having a tag ("NO" branch of block 412), process flows to operation 406 where the sample is discarded. In response to the data sample including a KPI tag ("YES" branch of block 412), operation proceeds from operation 414 to operation 416.

At operation 416 of method 400, a total number of KPI data samples per layered shape is collected and a determination is made as to whether the KPI samples for the layered shape is greater than a predetermined amount (e.g., enough KPI samples to provide a reliable assessment of network quality). In some embodiments, the total number of data samples per cell is determined by examining the KPI input data in operation 402. In response to less than ten KPI samples existing ("NO" branch of block 416), flow proceeds to operation 406 where the samples are discarded. In response to greater than a predetermined amount KPI samples existing (e.g., over a twenty-four-hour window) ("YES" branch of block 416), process flow moves from operation 416 to operation 418.

In table 2, an example is provided for sample criteria operation 416 is determining.

TABLE 2

| Technology (LTE/5 G) | Sample Criteria [Configurable] |
| --- | --- |
| RSRP/SS-RSRP | 10 |
| SINR/SS-SINR | 10 |
| DL | 5 |
| UL | 5 |
| Latency | 5 |

In some embodiments, operation 416 determines whether 10 RSRP samples, 10 SINR samples, 5 downlink samples, 5 uplink samples, and 5 latency samples are available before proceeding to operation 418. In some embodiments, only one of the sample criteria is met. In some embodiments, a majority or three out of the five sample criteria are available.

At operation 418 of method 400, a layered shape is created on a map, such as network visualization geographic area 300 where hexagons 302 are layered over map 308. In some embodiments, the KPI geo-located data is geo binned. Binning, also called discrete binning or bucketing, is a data pre-processing technique used to reduce the effects of minor observation errors. The original data values which fall into a given small interval, a bin and are replaced by a value representative of that interval, which is often the central value. Binning is a form of quantization. In some embodiments, Spark component 204 performs the geo-binning.

Figure 5:
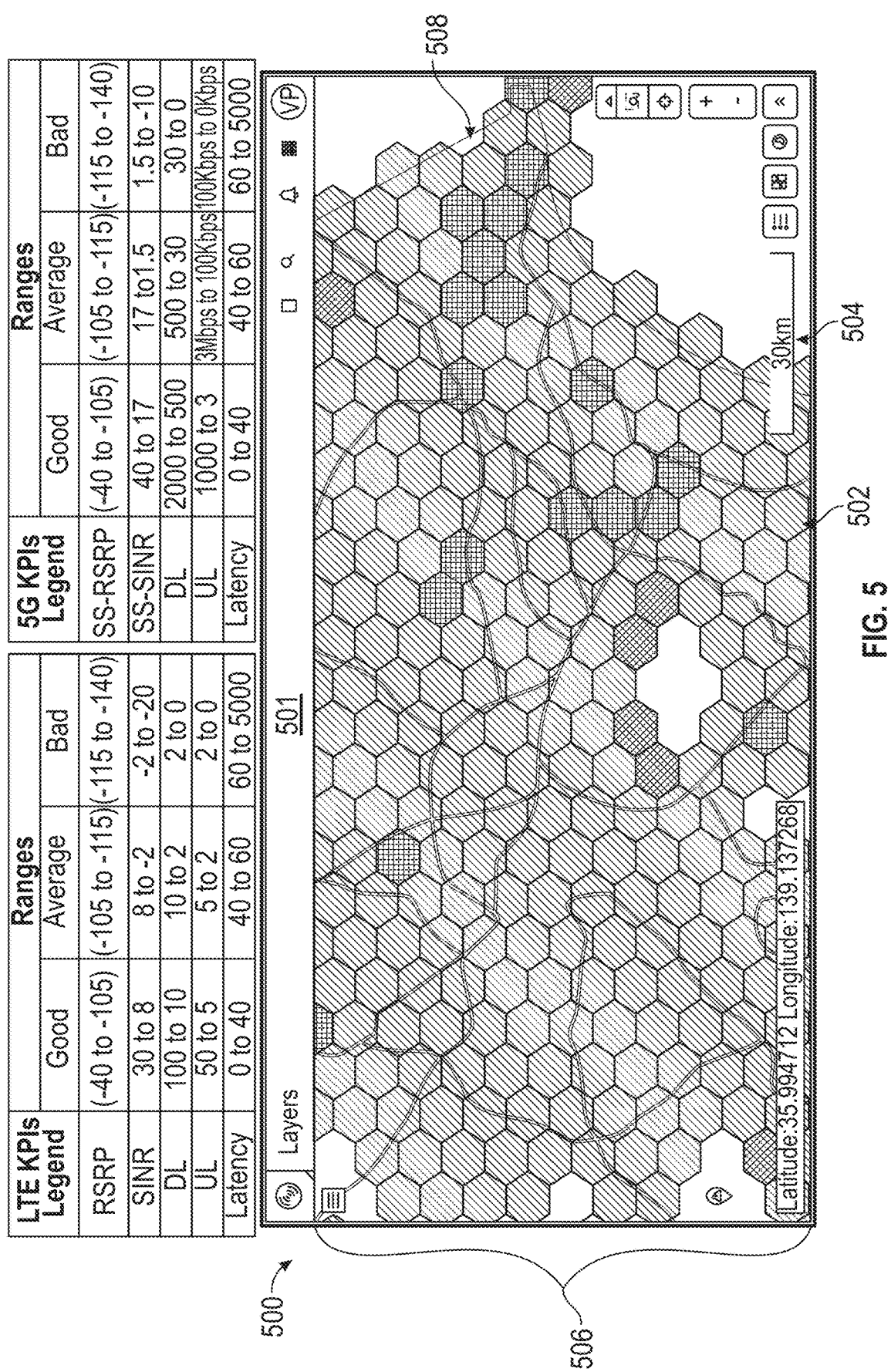
FIG. 5 is a pictorial representation of a NVDF user interface, in accordance with some embodiments.

FIG. 5 is a pictorial representation of a NVDF user interface 500, in accordance with some embodiments.

In FIG. 5, graphical user interface (GUI) 500 includes a display 501 that shows hexagons 502 layered over a map 508 representing a geographic area. Hexagons 502 are grouped into a grid 506 and the size of each hexagon 502 is determined by scale 504.

For each hexagon 502 representing good LTE coverage, that is an RSRP of between −40 to −105 dBm (decibels (dB) with reference to one milliwatt (mW)); a SINR of 30 to 8 dB; a downlink rate of 100 to 10 Mbps, an uplink rate of 50 to 5 Mbps, and/or a latency of 0-40 ms.

For each hexagon 502 representing good 5G coverage, that is an SS-RSRP of between −40 to −105 dBm; an SS-SINR of 40 to 17 dB; a downlink rate of 2,000 to 500 Mbps, an uplink rate of 1,000 to 3 Mbps, and/or a latency of 0-40 ms.

For each hexagon 502 representing an average LTE coverage, that is an RSRP of between −105 to −115 dBm; a SINR of 8 to −2 dB; a downlink rate of 10 to 2 Mbps, an uplink rate of 5 to 2 Mbps, and/or a latency of 40-60 ms.

For each hexagon 502 representing an average 5G coverage, that is an SS-RSRP of between −105 to −115 dBm; an SS-SINR of 17 to 1.5 dB; a downlink rate of 500 to 30 Mbps, an uplink rate of 3 Mbps to 100 Kbps, and/or a latency of 40-60 ms.

For each hexagon 502 representing a bad LTE coverage, that is an RSRP of between −115 to −140 dBm; a SINR of −2 to −20 dB; a downlink rate of 2 to 0 Mbps, an uplink rate of 2 to 0 Mbps, and/or a latency of 60-5,000 ms.

For each hexagon 502 representing a bad 5G coverage, that is an SS-RSRP of between −115 to −140 dBm; an SS-SINR of 1.5 to −10 dB; a downlink rate of 30 to 0 Mbps, an uplink rate of 100 to 0 Kbps, and/or a latency of 60-5,000 ms.

FIG. 6A is a pictorial representation of aggregation of multiple layered shapes 600A, in accordance with some embodiments.

As discussed above with reference to table 1, a user zooms in and zooms out on a graphical user interface (GUI) display, such as display 501. In response to a user zooming out to view a larger network coverage, NVDF module 120 performs an aggregation algorithm to provide coverage data for a layered shape, such as hexagon 502.

The aggregation logic for combining hexagons, based on a decreasing zoom level uses a weighted average algorithm. In a non-limiting example, the RSRP and the number of samples per hexagon, such as hexagons 602, 604, and 606, are used to determine the RSRP of a larger hexagon, such as hexagon 608. In some embodiments, hexagon 608 includes the same or a significant portion of hexagons 602, 604, and 606. Continuing with the example, (23 samples of hexagon 602 are multiplied by −83 dBm) and added to (54 samples of hexagon 606 multiplied by −104 dBm) and added to (11 samples of hexagon 604 multiplied by −94 dBm). Continuing with the example, the sum is divided by the total amount of samples (e.g., 23+54+11) of hexagons 602, 604, and 606. The result, −97.26 dBm, becomes a new RSRP for larger, or zoomed out, hexagon 608. As −97.26 dBm is within a good range for RSRP, hexagon 608 is indicated as a good coverage hexagon. In some embodiments, the initial data for each layered shape is determined at the lowest zoom level and aggregation is performed afterwards.

FIGS. 6B, 6C, and 6D are pictorial representations of user equipment user interfaces, in accordance with some embodiments.

In FIG. 6B, a UE UI 600B is a GUI display of network visualization at a zoom level, for example zoom level 17. A user has selected hexagon 610 which causes hexagon 610 to have a brighter hue compared to the other hexagons surrounding hexagon 610. Further, pop-out box 612 presents the user with an RSRP or SS-RSRP value, for example −105.36 dBm, which, according to the legend of FIG. 5, places hexagon 610 as within an average coverage. Further, hexagon 610 includes 11 samples (e.g., greater than the minimum samples for display) as of the date listed. At the bottom of UI 600B, pop-out box 614 further displays a maximum RSRP, for example −65.28 dBm, a minimum RSRP, for example −117.61 dBm, and an average RSRP, for example −99.48.

In FIG. 6C, a UI 600C displays similar information for hexagon 616, but for a later date, for example UI 600C is displayed on a date 33 days after the date of UI 600B. Hexagon 616 abuts hexagon 610 as shown from UIs 600B and 600C. In FIG. 6C, a user has selected hexagon 616 which will cause hexagon 616 to have a brighter hue compared to the hexagons surrounding hexagon 616. Further, pop-out box 618 presents the user with an RSRP or SS-RSRP value, for example −104.08 dBm, which, according to the legend of FIG. 5, places hexagon 616 as having good coverage. Further, hexagon 616 has 12 samples as of the date listed. At the bottom of UI 600C, pop-out box 620 further displays a maximum RSRP, for example −65.28 dBm, a minimum RSRP, for example −117.61 dBm, and an average RSRP, for example −99.48.

In FIG. 6D, a UI 600D displays a zoomed-out display, for example zoomed out two levels from 17 to 15 (e.g., from 2,500 $m^2$ to 40,000 $m^2$ in hexagon 622). According to an aggregation logic performed by NVDF module 120, a weighted average for hexagon 610 and 616 over a period between the date of UI 600B (e.g., Dec. 3, 2021) and UI 600C (e.g., Jan. 5, 2022) is performed to develop hexagon 622. That is, the RSRP value in pop-out box 624 is a representation of the sum, over several days, of the average RSRP of hexagon 610 multiplied by the number of samples of hexagon 610 with the average RSRP of hexagon 616 multiplied by the number of samples of hexagon 616, where the sum is divided by the total amount of samples of hexagon 610 and hexagon 616 over the period of time (e.g., 1101 as shown in pop-out box 624) to arrive at the weighted average RSRP of −96.58.

In pop-out box 626, the weighted average is also used to determine a maximum RSRP (e.g., −62.19), a minimum RSRP (e.g., −111.35) and an average RSRP (e.g., −89.86) for hexagon 622.

Figure 7:
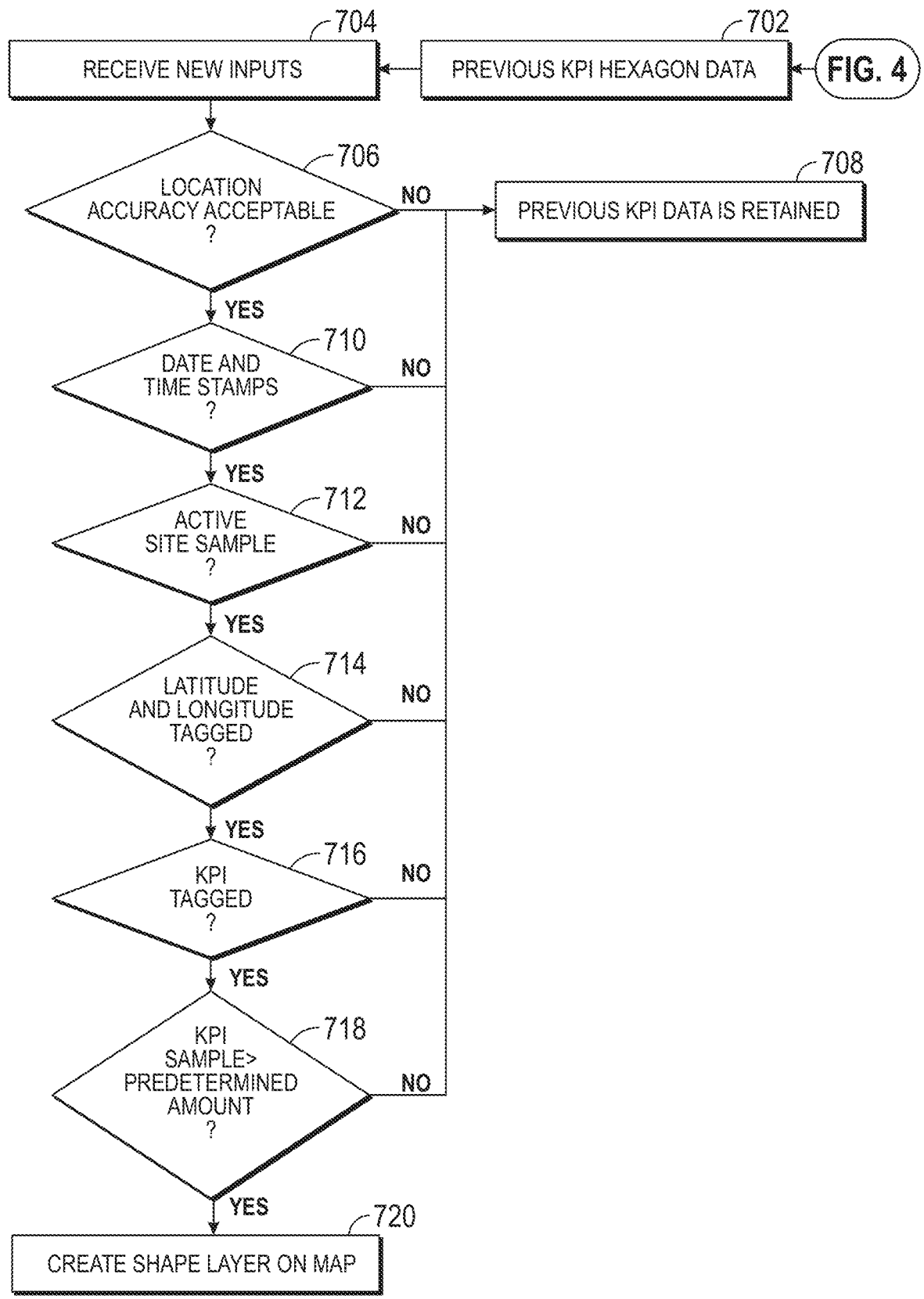
FIG. 7 is a flow diagram representation of a method for network visualization, in accordance with some embodiments.

FIG. 7 is a flow diagram representation of a method 700 for network visualization (NV), in accordance with some embodiments.

While the operations of method 700 are discussed and shown as having a particular order, each operation in method 700 is configured to be performed in any order unless specifically called out otherwise. Method 700 is implemented as a set of operations, such as operations 702 through 720.

In operation 702 of method 700, previous KPI layered shape data is collected (e.g., determined in method 400 of FIG. 4) from a database or memory, such as non-transitory, computer readable storage medium 1304. Operation flow moves from operation 702 to operation 704.

In operation 704 of method 700, current KPI data inputs are received. In some embodiments, NIFI component 202 gathers geo-located KPI samples that include serving eNB IDs, NR EARFCNs, PCIs, cell latitude and longitude, cell RSRP, cell SS-RSRP and other suitable geo-located samples in accordance with some embodiments. Operational flow moves from operation 704 to operation 706, where location accuracy is determined.

In operation 706 of method 700, a determination is made as to the location accuracy of the received KPI data samples. In some embodiments, location accuracy is determined based upon a known location of a cell, antenna, UE, or other suitable KPI producing node in embodiments of the present disclosure. In some embodiments, the location accuracy of the KPI data samples is within a threshold (e.g., less than 5 meters) to be acceptable. In some embodiments, in response to the accuracy of the KPI location data being greater than the threshold of known node location data, the KPI location data is not used for network visualization. In response to location accuracy of a sample being unreliable ("NO" branch of block 706), process flows to operation 708 where the previous KPI data for the layered shape is retained. In response to the location accuracy of a sample being acceptable ("YES" block of operation 706), operation proceeds from operation 706 to operation 710.

In operation 710 of method 700, a determination is made as to whether the data sample has date and time stamps (tags). In some embodiments, KPIs rely on a time stamp as part of their calculation. As part of the check for changed data, the time stamp is also considered. In response to the KPI data sample having no date and/or time stamp ("NO" branch of block 710), process flows to operation 708 where the previous KPI data for the layered shape is retained. In response to the data sample including a date and time stamp ("YES" branch of block 710), operation proceeds from operation 710 to operation 712.

In operation 712 of method 700, a determination is made as to whether the KPI data sample originates from a non-outage node (e.g., an active edge device or base station). In response to the data sample originating from an outage site ("NO" branch of block 712), process flows to operation 708 where the previous KPI data for the layered shape is retained. In response to the data sample originating from an active node ("YES" branch of block 712), operation proceeds from operation 712 to operation 714.

In operation 714 of method 700, a determination is made as to whether the KPI data sample contains a latitude and longitude tag. Geo-tagging is the process of adding geographic information about KPI data, within tags—including latitude and longitude coordinates, place names and/or other positional data. In response to the data sample not having a latitude and longitude tag ("NO" branch of block 714), process flows to operation 708 where the previous KPI data for the layered shape is retained. In response to the data sample including a latitude and longitude tag ("YES" branch of block 714), operation proceeds from operation 714 to operation 716.

In operation 716 of method 700, a determination is made as to whether the data sample KPI is tagged. KPI tags are an abbreviated title with a KPI value. Each KPI has a data source, entity set, and annotation file. The KPI value changes only in response to an action executed on transactional content. In response to the KPI sample not having a tag ("NO" branch of block 716), process flows to operation 708 where the previous KPI data for the layered shape is retained. In response to the data sample including a KPI tag ("YES" branch of block 716), operation proceeds from operation 716 to operation 718.

At operation 718 of method 700, a total number of KPI data samples per layered shape is collected and a determination is made as to whether the KPI samples for the layered shape is greater than a predetermined amount (e.g., 10 KPI samples to provide a reliable assessment of network quality). In some embodiments, the total number of data samples per cell is determined by examining the KPI input data in operation 704. In response to less than the predetermined amount of KPI samples existing ("NO" branch of block 718), flow proceeds to operation 708 where the previous KPI data for the layered shape is retained. In response to greater than a predetermined amount KPI samples existing (e.g., over a twenty-four-hour window) ("YES" branch of block 718), process flow moves from operation 718 to operation 720.

In operation 420 of method 700, a layered shape is created on a map, such as GUI display 501 where hexagons 302 are layered over map 508. In some embodiments, the KPI geo-located data is geo binned. Binning, also called discrete binning or bucketing, is a data pre-processing technique used to reduce the effects of minor observation errors. The original data values which fall into a given small interval, a bin and are replaced by a value representative of that interval, which is often the central value. Binning is a form of quantization. In some embodiments, Spark component 204 performs the geo-binning.

Figure 8:
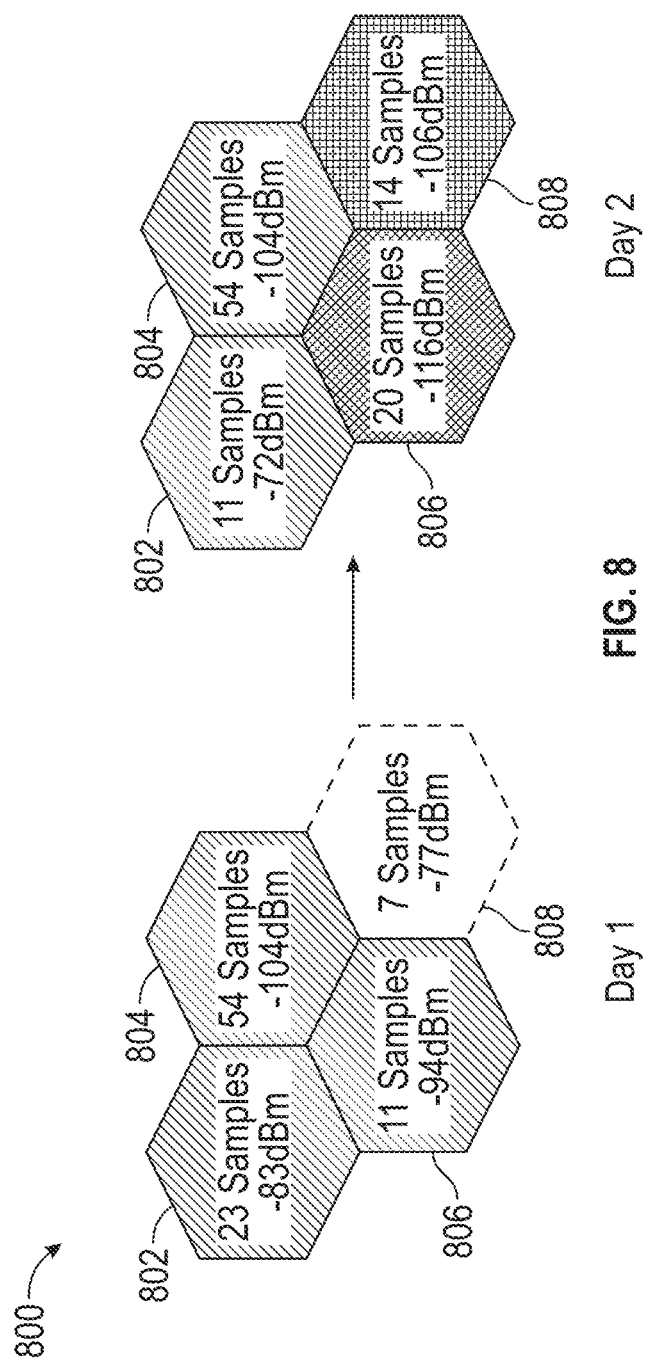
FIG. 8 is a pictorial representation of periodic layered shape presentation, in accordance with some embodiments.

FIG. 8 is a pictorial representation 800 of periodic layered shape presentation, in accordance with some embodiments.

In pictorial representation 800, on day 1 hexagon 802, includes 23 samples (which is greater than 10 samples) and an RSRP value of −83 dBm. Hexagon 804 includes 54 samples (which is greater than 10 samples) and an RSRP value of −104 dBm. Hexagon 806 includes 11 samples (which is greater than 10 samples) and an RSRP value of −94 dBm. Hexagon 808 includes 7 samples received (which is less than 10 samples) and an RSRP value of −77 dBm. As hexagon 808 has less than 10 samples, hexagon 808 is not created and remains off a display, such as display 501 (FIG. 5).

On day two, hexagon 802 includes 11 samples (which is greater than 10 samples) and a RRP value of −72 dBm. Hexagon 804 retains day one values as 8 samples (which is less than 10 samples) are collected on day 2 with a −84 dBm value received. Thus, day 2 values for hexagon 804 are not displayed and instead day 1 values for hexagon 804. Hexagon 806 includes 20 samples (which is greater than 10 samples) and an RSRP value of −116 dBm, which is displayed, but has changed in display as −116 dBm is a bad condition (see legend on FIG. 5). Hexagon 808 includes 14 samples (which is greater than 10 samples) and an RSRP value of −106 dBm. Day 2 hexagon 808 includes enough samples to create a layered hexagon shape that is displayed as average according to the RSRP value of −106 dBm.

Figures 9A, 9B:
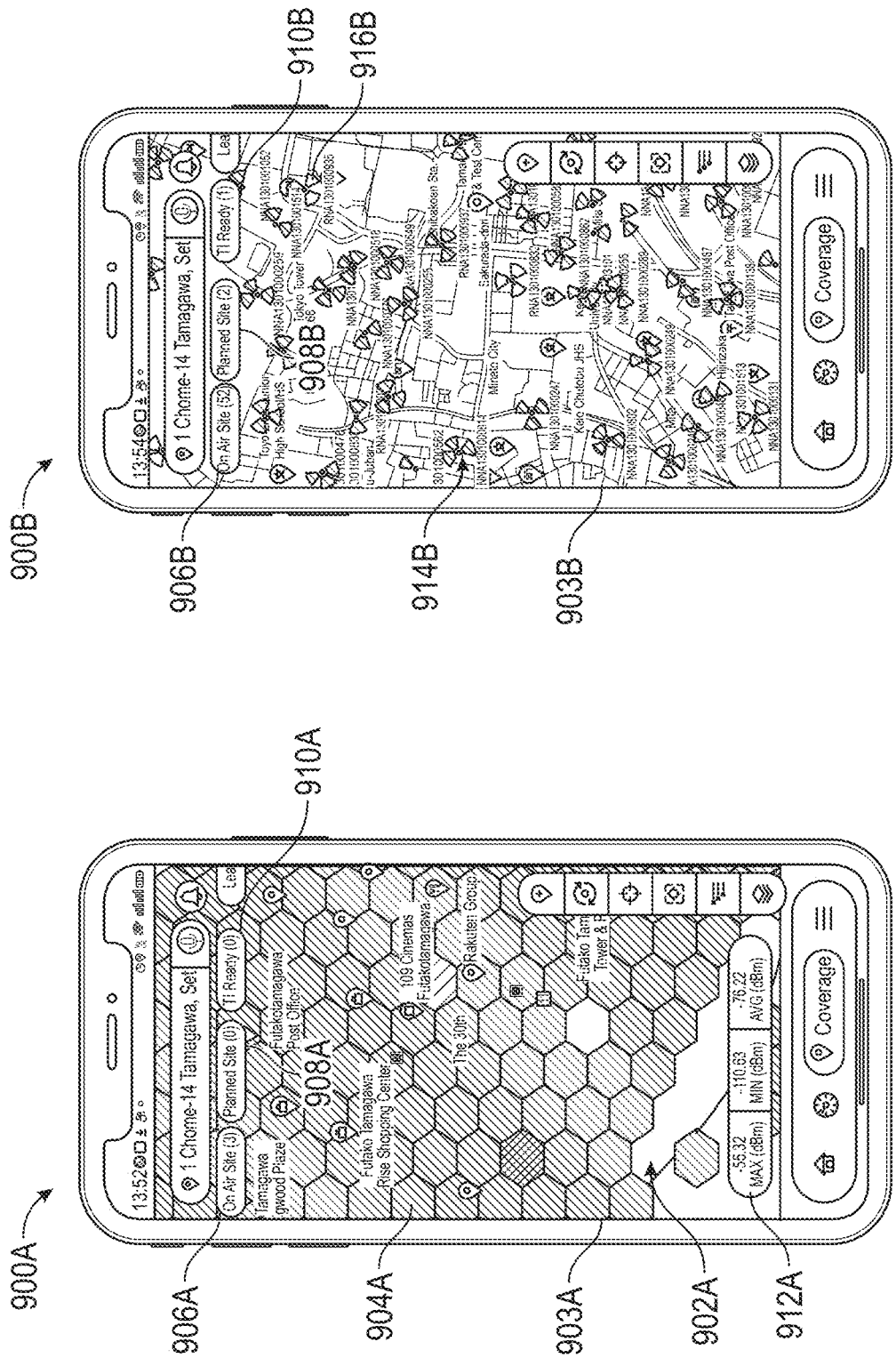
FIGS. 9A and 9B are pictorial representations of mobile graphic user interfaces for a NVDFS, in accordance with some embodiments.

FIGS. 9A and 9B are pictorial representations of mobile graphic user interfaces 900A and 900B for a NVDFS 100, in accordance with some embodiments.

In FIG. 9A, GUI 900A displays map 902A, representing a geographic area, which is overlayed with hexagon shapes 904A within viewport 903A discussed in detail above. Further, shown in viewport 903A, user selection fields 906A, 908A, 910A provide a summary of all on air sites (3) at user selection field 906A, planned sites (0) at user selection field 908A, and testing and implementing (TI) sites (0) at user selection field 910A. Informational bar 912A provides a user with the maximum RSRP in dBm (e.g., −55.32 dBm) within viewport 903A (e.g., the hexagon shape 904A with the largest RSRP within viewport 903A). Informational bar 912A further provides a minimum RSRP in dBm (e.g., −110.63), which is represented by a hexagon within viewport 903A. Informational bar 912A further provides an average RSRP in dBm (e.g., −76.22) of all hexagons within viewport 903A.

In some embodiments, the maximum RSRP, the minimum RSRP, and the average RSRP, are determined based upon the hexagon with the largest RSRP, the hexagon with the lowest RSRP, and average RSRP for each hexagon 904A within a viewport over a predetermined amount of time. Informational bar 912A provides a user with an overall understanding of network coverage for the area within viewport 903A.

In FIG. 9B a user visualizes each site (e.g., base station or edge device) within viewport 903B. Each site, such as site 914B, includes a lobed sector representation of each base station (e.g., a lobe for each of three antennas) and includes an identifier (such as a color, shading, thatching, icon, or symbol) to represent signal coverage (such as a good, average, or poor signal coverage). See for example site 916B that is showing an identifier representing a poor signal coverage.

Further, a user is able to select one of user selection fields 906A, 908A, 910A to view all on air sites (52) by selecting user selection field 906B, all planned sites (2) by selecting user selection field 908B, and all testing and implementing (TI) sites (1) at by selecting user selection field 910B.

Figure 10:
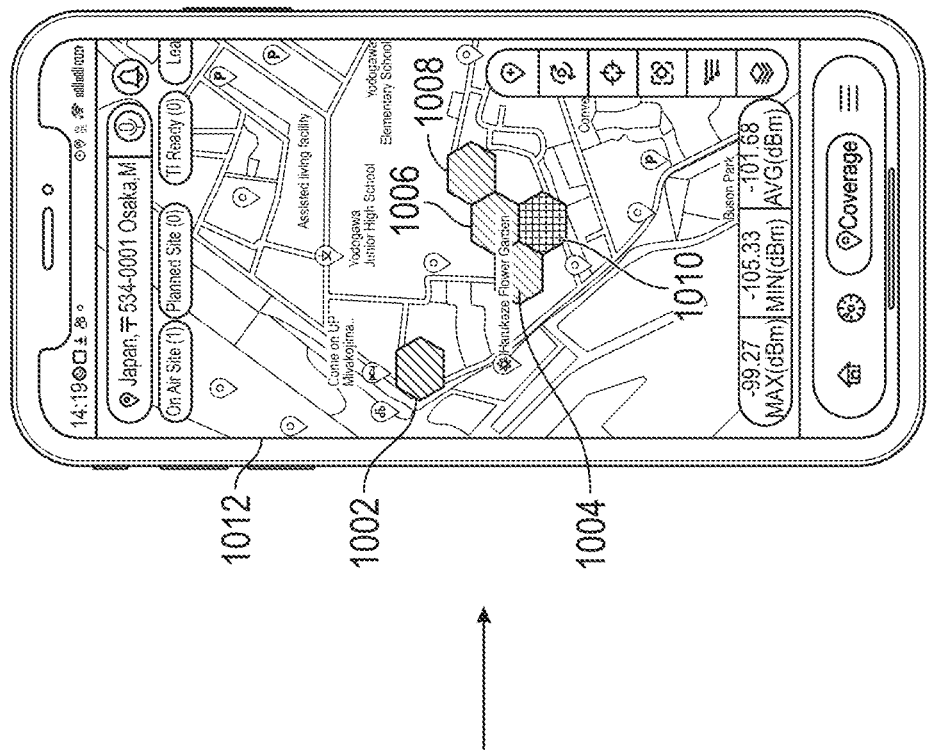
FIG. 10 is a pictorial representation of the aggregation of multiple shapes, in accordance with some embodiments.
Figure 10:
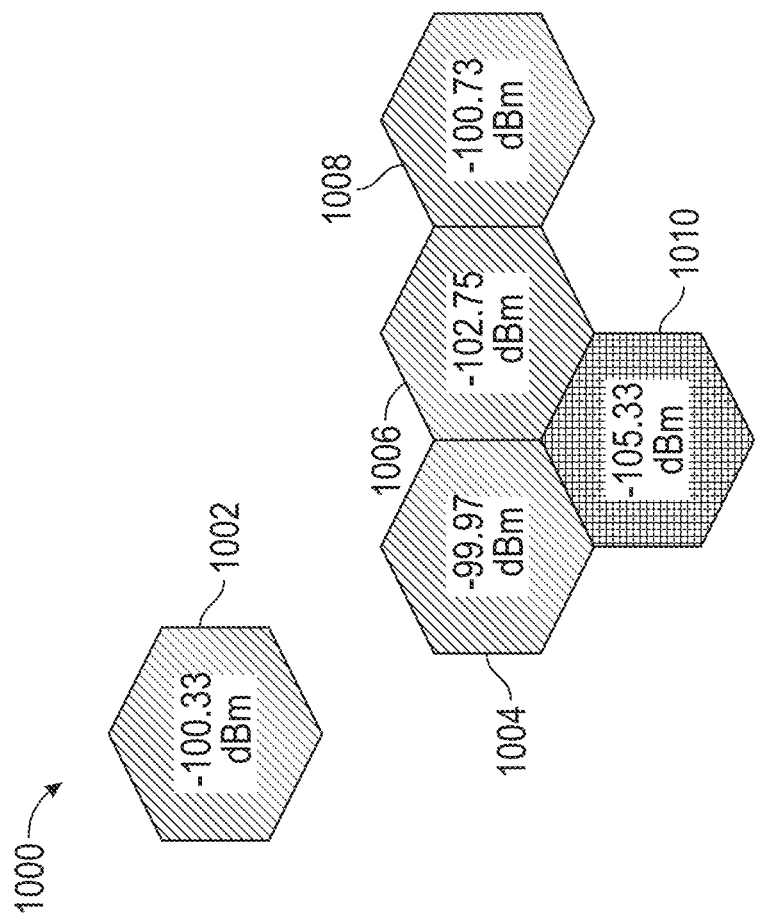

FIG. 10 is a pictorial representation of the aggregation of multiple shapes 1000, in accordance with some embodiments.

In some embodiments, the minimum RSRP hexagon, maximum RSRP hexagon, and the average RSRP of each hexagon within viewport 1012 is based on the hexagons within viewport 1012. In a non-limiting example, hexagons 1002, 1004, 1006, 1008, and 1010 are the hexagons displayed in viewport 1012. The minimum RSRP is determined by filtering and determining the hexagon with the lowest RSRP, which for the non-limiting example is hexagon 1010 (e.g., −105.33 dBm). The maximum RSRP is determined by filtering and determining the hexagon with the highest RSRP, which for the non-limiting example is hexagon 1004 (e.g., −99.97 dBm). The average RSRP is determined by averaging hexagons 1002, 1004, 1006, 1008, and 1010, which for the non-limiting example is −101.68 dBm.

Figure 11A:
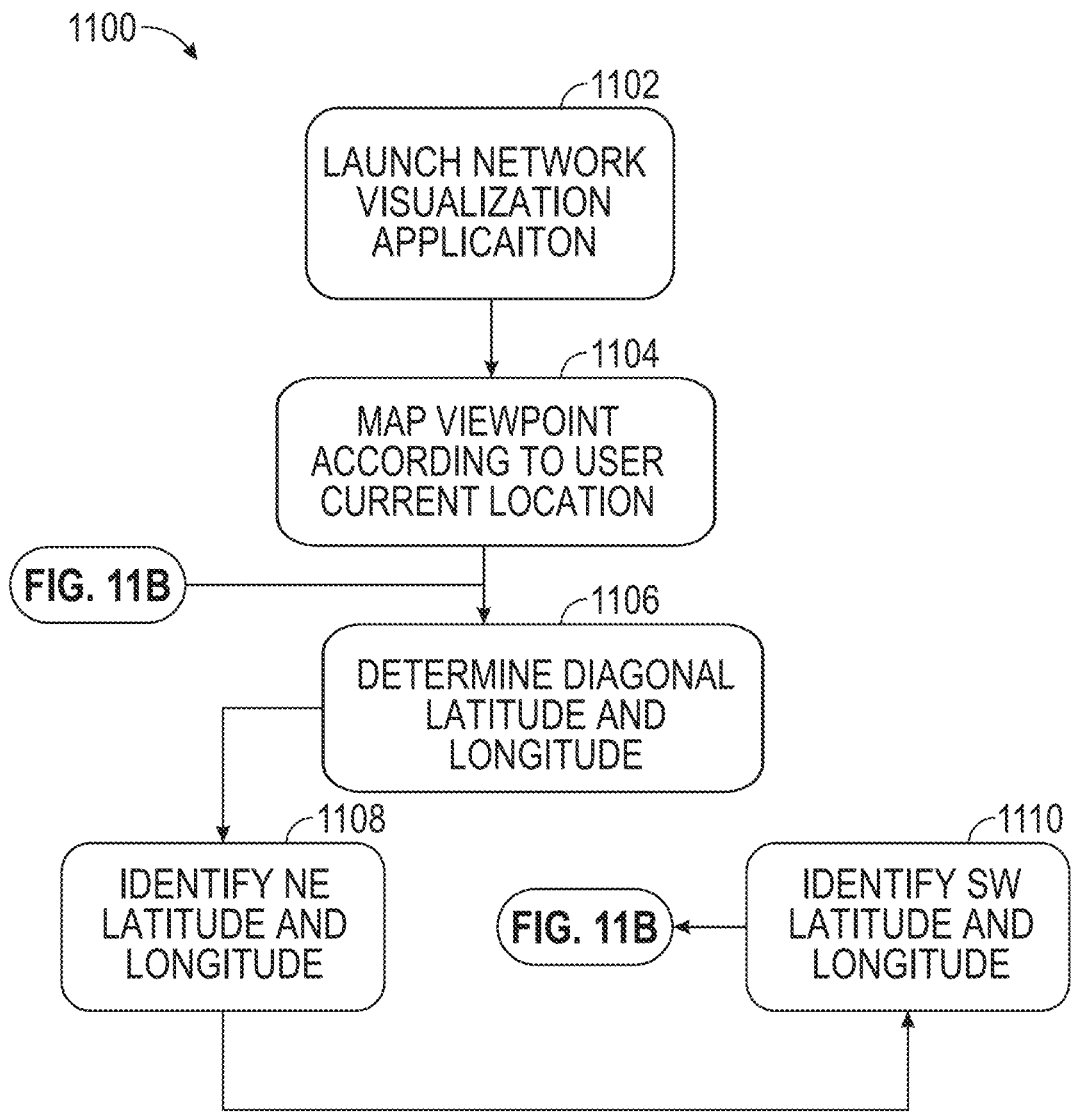

FIGS. 11A and 11B are flow diagram representations of a method 1100 for network viewport data fetching (NVDF), in accordance with some embodiments.

While the operations of method 1100 are discussed and shown as having a particular order, each operation in method 1100 is configured to be performed in any order unless specifically called out otherwise. Method 1100 is implemented as a set of operations, such as operations 1102 through 1128.

Figure 12:
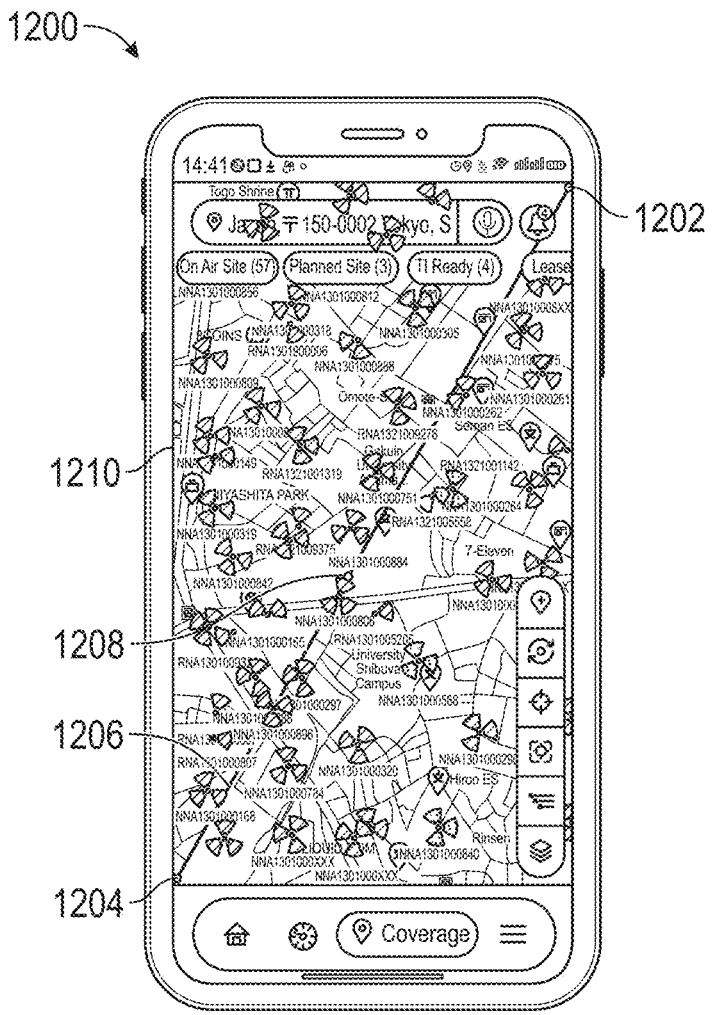
FIG. 12 is a pictorial representation of a mobile graphic user interface for a NVDFS, in accordance with some embodiments.

FIG. 12 is a pictorial representation of a mobile graphic user interface 1200 for an NVDFS, in accordance with some embodiments. FIGS. 11A, 11B and 12 are discussed together for a better understanding.

In some embodiments, network viewport data fetching is made more efficient. In a non-limiting example, when a user moves or adjusts the map (e.g., sliding the viewport to the right, left, up, down, or diagonally) new data is processed to properly represent new hexagons overlaid on a new area of map displayed for the user. Thus, continuing with the non-limiting example, in response to the user sliding the viewport (even just a small amount), data is processed to account for the new map area, hexagons to be displayed, and coverage representation of the hexagons. This processing has the potential to create a lag in displaying the viewport properly as the processing of large amounts of data slows the user's ability to visualize the network. In some embodiments, NVDFS 100 efficiently obtains, processes, and displays data at a lower data consumption rate, thus improving the response of the user interface (UI) while processing lower amounts of data, and reducing data lag. In some embodiments, in response to a viewport movement threshold being surpassed, the viewport is updated including viewport representation data processed for a geographic area of the viewport as well as the hexagon shapes representing network coverage quality. In some embodiments, in response to viewport movement threshold being met or unsurpassed the, the viewport updates the geographic area represented by the viewport movement, but the hexagon shapes representing network coverage quality are not updated (e.g., for the new geographic area there are no hexagon shapes representing network coverage quality).

At operation 1102 of method 1100, a user launches a network viewport data fetching application. In a non-limiting example, a network visualization application resides on the desktop of a mobile device and activated by opening the application. Process flows from operation 1102 to operation 1104.

At operation 1104 of method 1100, NVDFS 100 obtains a map of a geographic area to display on a viewport based upon a user's location. In a non-limiting example, the user's location is provided by global positioning. In some embodiments, the user's location is based upon triangulation with three or more of the nearest base stations or edge devices. Other suitable methods of determining the user's locations are within the scope of the present disclosure. Process flows from operation 1104 to operation 1106.

At operation 1106 of method 1100, NVDFS 100 determines latitudes and longitudes of endpoints of a viewport diagonal. With reference to GUI 1200 (FIG. 12), NVDFS 100 determines the latitude and longitude of endpoints 1202 (e.g., the northeast latitude and longitude) and 1204 (e.g., the southwest latitude and longitude). Diagonal 1206 extends from endpoints 1202 and 1204 with midpoint 1208 located at the middle of diagonal 1206. In a non-limiting example, endpoints 1202 and 1204 correspond to a latitude and longitude in the geographic area on the map. Thus, in response to a user sliding the viewport (e.g., with a thumb to visualize the network coverage in another geographic area), the endpoints move with the map. Nevertheless, the midpoint remains on the diagonal, which does not move but remains with the viewport. Process flows from operation 1106 to operation 1108.

In operation 1108 of method 1100, NVDFS 100 determines a northeast latitude and longitude based upon the location of endpoint 1202 on viewport 1210. In operation 1110 of method 1100, NVDFS 100 determines a southwest latitude and longitude based upon the location of endpoint 1204 layered over the geographic area. In some embodiments, NVDFS 100 determines a diagonal, like viewport diagonal 1206 that extends from left to right instead of right to left or from northeast to southwest instead of northwest to southeast as shown in FIG. 12. Diagonal 1206 remains with viewport 1210 and are unconnected to endpoints 1202 and 1204. Process flows from operation 1110 to operation 1112.

With reference to FIG. 11B, in operation 1112 of method 1100, NVDFS 100 determines a midpoint, such as midpoint 1208, on a diagonal, such as diagonal 1206. In a non-limiting example, the midpoint is determined by determining the total distance between the endpoints and halving the distance. Process flows from operation 1112 to operation 1114.

In operation 1114 of method 1100, NVDFS 100 determines the distance between the midpoint, such as midpoint 1208 and the endpoints, such as endpoints 1202 and 1204. In some embodiments, this distance is known from operation 1112. In some embodiments, the distance is based upon the zoom scale of viewport 1210. In some embodiments, NVDFS 100 determines a latitude and longitude of midpoint 1208 and calculates a distance to endpoints 1202 and 1204 based upon the latitudes and longitudes of midpoint 1208 and endpoints 1202 and 1204. Process flows from operation 1114 to operation 1116.

In operation 1116 of method 1100, NVDFS 100 determines whether the viewport zoom level is greater than a predetermined setting. In a non-limiting example, in response to the zoom level is greater than the setting (e.g., zoom level 13 and above where the viewport displays 60 $Km^2$ or less), ("YES" branch of block 1116) process proceeds to operation 1118. In some embodiments, the predetermined setting is user controlled or controlled on a use-by-use basis.

In operation 1118 of method 1100, NVDFS 100 determines whether the distance between the midpoint, such as midpoint 1208 and an endpoint, such as endpoints 1202 or 1204, has increased by a quarter (¼) of the total distance of the diagonal (or half the distance to the midpoint). In response to the distance between the midpoint and either of the endpoints not surpassing a quarter of the total distance of the diagonal ("NO" branch of block 1118), process flows to operation 1122 where the geographic area within the viewport is updated (e.g., the map) to reflect the user's movement of the map; if any (however, the hexagon shapes are not updated). In some embodiments, updating the geographic area in the viewport, but not the hexagon shapes, represents that the user has not moved the map or data represented in the viewport far enough to begin the process of data processing for the representation of the hexagon shapes within the viewport. Thus, no data is processed and no risk of data lag or constant updating of data as the map moves across the viewport. Process flows from operation 1122 to operation 1118.

In response to the distance between the midpoint and the endpoint surpassing a quarter of the total distance of the diagonal ("YES" branch of block 1118), process flows to operation 1120 where both the geographic area and the layered shapes (e.g., hexagons) is updated and KPI data representation through the layered shaped is processed, and a new view in the viewport is obtained. In a non-limiting example, in response to the diagonal having a scaled distance (based upon the scale of the map within the viewport) of 20 Km and the distance between the midpoint and one of the endpoints surpasses 5 Km, then both the geographic map and the layered shapes are processed. In response to the distance between the midpoint and one of the endpoints being less than or equal to 5 Km, then the geographic map is updated, but not the layered shapes. Thus, reducing the amount of data processed when updating the layered shape representation. In some embodiments, the process flows to operation 1106 where new endpoints are determined.

In response to the zoom level being less than or equal to the predetermined amount (e.g., zoom level of 12 or smaller displaying 60 $Km^2$ and greater), ("NO" branch of block 1116) process proceeds to operation 1124.

In operation 1124 of method 1100, NVDFS 100 determines whether the distance between the midpoint, such as midpoint 1208 and an endpoint, such as endpoints 1202 or 1204, has increased by a third (⅓) of the total distance of the diagonal. In response to the distance between the midpoint and either endpoint being less than or equal to a third of the total distance of the diagonal ("NO" branch of block 1124), process flows to operation 1128 where the geographic area within the viewport is updated, but the layered shapes are not processed. Thus, no KPI data for processing the layered shaped is processed and no risk of a data lag. With greater geographic area represented within smaller zoom displays (e.g., greater than 60 $Km^2$), a greater distance between the midpoint and either endpoint is used as the amount of data processed for the layered shapes is increased due to the larger geographic area.

In response to the distance between the midpoint and the endpoint being greater than a third of the total distance of the diagonal ("YES" branch of block 1124), process flows to operation 1126 where both the geographic area and the layered shapes are refreshed, and new KPI data is obtained and processed for the layered shaped network visualization over the new geographic area. In some embodiments, the process flows to operation 1106 where new endpoints are determined.

FIG. 13 is a block diagram of a network viewport data fetching (NVDF) processing circuitry 1300 in accordance with some embodiments. In some embodiments, NVDF processing circuitry 1300 is a general-purpose computing device including a hardware processor 1302 and a non-transitory, computer-readable storage medium 1304. Storage medium 1304, amongst other things, is encoded with, i.e., stores, computer program code 1306, i.e., a set of executable instructions such as NVDF algorithm (e.g., a weighted average algorithm) and methods 400, 700, and 1100. Execution of instructions 1306 by hardware processor 1302 represents (at least in part) a network viewport data fetching application which implements a portion, or all the methods described herein in accordance with one or more embodiments (hereinafter, the noted processes and/or methods).

Processor 1302 is electrically coupled to a computer-readable storage medium 1304 via a bus 1308. Processor 1302 is electrically coupled to an I/O interface 1310 by bus 1308. A network interface 1312 is also electrically connected to processor 1302 via bus 1308. Network interface 1312 is connected to a network 914, so that processor 1302 and computer-readable storage medium 1304 connect to external elements via network 914. Processor 1302 is configured to execute computer program code 1306 encoded in computer-readable storage medium 1304 to cause network viewport data fetching processing circuitry 1300 to be usable for performing a portion or all the noted processes and/or methods. In one or more embodiments, processor 1302 is a Central Processing Unit (CPU), a multi-processor, a distributed processing system, an Application Specific Integrated Circuit (ASIC), and/or a suitable processing unit.

In one or more embodiments, computer-readable storage medium 1304 is an electronic, magnetic, optical, electromagnetic, infrared, and/or a semiconductor system (or apparatus or device). For example, computer-readable storage medium 1304 includes a semiconductor or solid-state memory, a magnetic tape, a removable computer diskette, a Random Access Memory (RAM), a Read-Only Memory (ROM), a rigid magnetic disk, and/or an optical disk. In one or more embodiments using optical disks, computer-readable storage medium 1304 includes a Compact Disk-Read Only Memory (CD-ROM), a Compact Disk-Read/Write (CD-R/W), and/or a Digital Video Disc (DVD).

In one or more embodiments, storage medium 1304 stores computer program code 1306 configured to cause NVDF processing circuitry 1300 to be usable for performing a portion or all the noted processes and/or methods. In one or more embodiments, storage medium 1304 also stores information, such as NVDF algorithm which facilitates performing a portion or all the noted processes and/or methods.

Network viewport data fetching circuitry 1300 includes I/O interface 1310. I/O interface 1310 is coupled to external circuitry. In one or more embodiments, I/O interface 1310 includes a keyboard, keypad, mouse, trackball, trackpad, touchscreen, and/or cursor direction keys for communicating information and commands to processor 1302.

NVDF processing circuitry 1300 also includes network interface 1312 coupled to processor 1302. Network interface 1312 allows NVDF processing circuitry 1300 to communicate with network 914, to which one or more other computer systems are connected. Network interface 1312 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more unified coverage processing circuitry 1300.

NVDF processing circuitry 1300 is configured to receive information through I/O interface 1310. The information received through I/O interface 1310 includes one or more of instructions, data, design rules, libraries of standard cells, and/or other parameters for processing by processor 1302. The information is transferred to processor 1302 via bus 1308. NV processing circuitry 1300 is configured to receive information related to a UI through I/O interface 1310. The information is stored in computer-readable medium 1304 as User Interface (UI) 1322.

In some embodiments, a method of network viewport data fetching includes receiving a request at a mobile device to launch a network visualization application; causing a graphical user interface (GUI) to be output by a user interface (UI), the GUI including a display of a viewport corresponding to a map of a first geographic area and layered over the first geographic area one or more shapes that display an indication of network coverage quality; determining a latitude and longitude of a first endpoint at a corner of the viewport and a second endpoint at an opposing corner of the viewport; determining a distance of a diagonal extending from the first endpoint to the second endpoint; determining a midpoint of the diagonal; in response to a distance between the midpoint and either the first or second endpoint being less than or equal to a threshold distance, updating the display of the viewport corresponding to a map of a second geographic area without updating the one or more shapes that display the indication of network coverage quality; or in response to the distance between the midpoint and either the first or second endpoint being greater than the threshold distance, updating the display of the viewport corresponding to a map of a third geographic area and updating the one or more shapes that display the indication of network coverage quality.

In some embodiments, the method of network viewport data fetching further includes determining a location of the mobile device, where the first geographic area displayed on the viewport represents the location of the mobile device.

In some embodiments, the method of network viewport data fetching further includes determining a midpoint latitude and longitude.

In some embodiments, the midpoint is a first midpoint, the method further includes determining the first midpoint latitude and longitude; and in response to the updating the display of the viewport corresponding to the map of the third geographic area and the updating of the one or more shapes that display the indication of network coverage quality, determining a second midpoint latitude and longitude.

In some embodiments, the method of network viewport data fetching further includes determining the distance between the midpoint and the first and second endpoint; and in response to the updating the display of the viewport corresponding to the map of the third geographic area and the updating of the one or more shapes that display the indication of network coverage quality, determining a distance between the midpoint and a third and fourth endpoint.

In some embodiments, the method of network viewport data fetching further includes determining a zoom level of the viewport; in response to the zoom level being greater than a predetermined level, setting the threshold distance at one-quarter of the distance of the diagonal; or in response to the zoom level being less than or equal to the predetermined level, setting the threshold distance at one-third of the distance of the diagonal.

In some embodiments, the method of network viewport data fetching further includes determining, based on each of the one or more layered shapes, a maximum reference signal received power (RSRP) represented by a first layered shape; determining, based on each of the one or more layered shapes, a minimum RSRP represented by a second layered shape; determining, based on each of the one or more layered shapes, an average RSRP of the one or more layered shapes; determining, based on each of the one or more layered shapes, eNB IDs of the one or more layered shapes; determining, based on each of the one or more layered shapes, NR EARFCNs of the one or more layered shapes; determining, based on each of the one or more layered shapes, PCIs of the one or more layered shapes; determining, based on each of the one or more layered shapes, cell latitude and longitude, of the one or more layered shapes; determining, based on each of the one or more layered shapes, cell RSRP of the one or more layered shapes; determining, based on each of the one or more layered shapes, cell SS-RSRP of the one or more layered shapes; determining, based on each of the one or more layered shapes, SINR of the one or more layered shapes; determining, based on each of the one or more layered shapes, SS-SINR of the one or more layered shapes; determining, based on each of the one or more layered shapes, data throughput of the one or more layered shapes; determining, based on each of the one or more layered shapes, latency of the one or more layered shapes; determining, based on each of the one or more layered shapes, layer-three drive data of the one or more layered shapes; and determining, based on each of the one or more layered shapes, UE KPIs of the one or more layered shapes.

In some embodiments, the method of network viewport data fetching further includes updating the display of the viewport to include an informational bar that displays the maximum RSRP, the minimum RSRP, and the average RSRP.

In some embodiments, an apparatus for network viewport data fetching includes a processor; and a memory having instructions stored thereon that, when executed by the processor, cause the apparatus to receive a request at a mobile device to launch a network visualization application; cause a graphical user interface (GUI) to be output by a user interface (UI), the GUI includes a display of a viewport corresponding to a map of a first geographic area and layered over the first geographic area one or more shapes that display an indication of network coverage quality; determine a latitude and longitude of a first endpoint at a corner of the viewport and a second endpoint at an opposing corner of the viewport; determine a distance of a diagonal extending from the first endpoint to the second endpoint; determine a midpoint of the diagonal; in response to a distance between the midpoint and either the first or second endpoint being less than or equal to a threshold distance, update the display of the viewport corresponding to a map of a second geographic area without updating the one or more shapes that display the indication of network coverage quality; or in response to the distance between the midpoint and either the first or second endpoint being greater than the threshold distance, update the display of the viewport corresponding to a map of a third geographic area and updating the one or more shapes that display the indication of network coverage quality.

In some embodiments, the instructions further cause the processor to determine a location of the mobile device, where the first geographic area displayed on the viewport represents the location of the mobile device.

In some embodiments, the instructions further cause the processor to determine a midpoint latitude and longitude.

In some embodiments, the midpoint is a first midpoint and the instructions further cause the processor to determine the first midpoint latitude and longitude; and in response to the updating the display of the viewport corresponding to the map of the third geographic area and the updating of the one or more shapes that display the indication of network coverage quality, determine a second midpoint latitude and longitude.

In some embodiments, the instructions further cause the processor to determine the distance between the midpoint and the first and second endpoint; and in response to the updating the display of the viewport corresponding to the map of the third geographic area and the updating of the one or more shapes that display the indication of network coverage quality, determine a distance between the midpoint and a third and fourth endpoint.

In some embodiments, the instructions further cause the processor to determine a zoom level of the viewport; in response to the zoom level being greater than a predetermined level, set the threshold distance at one-quarter of the distance of the diagonal; or in response to the zoom level being less than or equal to the predetermined level, set the threshold distance at one-third of the distance of the diagonal.

In some embodiments, the instructions further cause the processor to determine, based on each of the one or more layered shapes, a maximum reference signal received power (RSRP) represented by a first layered shape; determine, based on each of the one or more layered shapes, a minimum RSRP represented by a second layered shape; and determine, based on each of the one or more layered shapes, an average RSRP of the one or more layered shapes.

In some embodiments, the instructions further cause the processor to update the display of the viewport to include an informational bar that displays the maximum RSRP, the minimum RSRP, and the average RSRP.

In some embodiments, a non-transitory computer readable medium having instructions stored thereon that, when executed by a processor, cause an apparatus to receive a request at a mobile device to launch a network visualization application; cause a graphical user interface (GUI) to be output by a user interface (UI), the GUI including a display of a viewport corresponding to a map of a first geographic area and layered over the first geographic area one or more shapes that display an indication of network coverage quality; determine a latitude and longitude of a first endpoint at a corner of the viewport and a second endpoint at an opposing corner of the viewport; determine a distance of a diagonal extending from the first endpoint to the second endpoint; determine a midpoint of the diagonal; in response to a distance between the midpoint and either the first or second endpoint being less than or equal to a threshold distance, update the display of the viewport corresponding to a map of a second geographic area without updating the one or more shapes that display the indication of network coverage quality; or in response to the distance between the midpoint and either the first or second endpoint being greater than the threshold distance, update the display of the viewport corresponding to a map of a third geographic area and updating the one or more shapes that display the indication of network coverage quality.

In some embodiments, the instructions further cause the processor to determine a location of the mobile device, where the first geographic area displayed on the viewport represents the location of the mobile device.

In some embodiments, the instructions further cause the processor to determine a midpoint latitude and longitude.

In some embodiments, the midpoint is a first midpoint and the instructions further cause the processor to determine the first midpoint latitude and longitude; and in response to the updating the display of the viewport corresponding to the map of the third geographic area and the updating of the one or more shapes that display the indication of network coverage quality, determine a second midpoint latitude and longitude.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method of network viewport data fetching, the method comprising:
   receiving a request at a mobile device to launch a network visualization application;
   causing a graphical user interface (GUI) to be output by a user interface (UI), the GUI comprising:
      a display of a viewport corresponding to a map of a first geographic area and layered over the first geographic area one or more shapes that display an indication of network coverage quality;
   determining a latitude and longitude of a first endpoint at a corner of the viewport and a second endpoint at an opposing corner of the viewport;
   determining a distance of a diagonal extending from the first endpoint to the second endpoint;
   determining a midpoint of the diagonal;
   in response to a distance between the midpoint and either the first or second endpoint being less than or equal to a threshold distance, updating the display of the viewport corresponding to a map of a second geographic area without updating the one or more shapes that display the indication of network coverage quality; or
   in response to the distance between the midpoint and either the first or second endpoint being greater than the threshold distance, updating the display of the viewport corresponding to a map of a third geographic area and updating the one or more shapes that display the indication of network coverage quality.

2. The method of network viewport data fetching of claim 1, further comprising:
   determining a location of the mobile device, where the first geographic area displayed on the viewport represents the location of the mobile device.

3. The method of network viewport data fetching of claim 1, further comprising:
   determining a midpoint latitude and longitude.

4. The method of network viewport data fetching of claim 1, wherein the midpoint is a first midpoint, the method further comprising:
   determining the first midpoint latitude and longitude; and
   in response to the updating the display of the viewport corresponding to the map of the third geographic area and the updating of the one or more shapes that display the indication of network coverage quality, determining a second midpoint latitude and longitude.

5. The method of network viewport data fetching of claim 1, further comprising:
determining the distance between the midpoint and the first and second endpoint; and
in response to the updating the display of the viewport corresponding to the map of the third geographic area and the updating of the one or more shapes that display the indication of network coverage quality, determining a distance between the midpoint and a third and fourth endpoint.

6. The method of network viewport data fetching of claim 1, further comprising:
determining a zoom level of the viewport;
in response to the zoom level being greater than a predetermined level, setting the threshold distance at one-quarter of the distance of the diagonal; or
in response to the zoom level being less than or equal to the predetermined level, setting the threshold distance at one-third of the distance of the diagonal.

7. The method of network viewport data fetching of claim 1, further comprising:
determining, based on each of the one or more layered shapes, a maximum reference signal received power (RSRP) represented by a first layered shape;
determining, based on each of the one or more layered shapes, a minimum RSRP represented by a second layered shape; and
determining, based on each of the one or more layered shapes, an average RSRP of the one or more layered shapes.

8. The method of network viewport data fetching of claim 7, further comprising:
updating the display of the viewport to include an informational bar that displays the maximum RSRP, the minimum RSRP, and the average RSRP.

9. An apparatus for network viewport data fetching, the apparatus comprising:
a processor; and
a memory having instructions stored thereon that, when executed by the processor, cause the apparatus to:
receive a request at a mobile device to launch a network visualization application;
cause a graphical user interface (GUI) to be output by a user interface (UI), the GUI comprising:
a display of a viewport corresponding to a map of a first geographic area and layered over the first geographic area one or more shapes that display an indication of network coverage quality;
determine a latitude and longitude of a first endpoint at a corner of the viewport and a second endpoint at an opposing corner of the viewport;
determine a distance of a diagonal extending from the first endpoint to the second endpoint;
determine a midpoint of the diagonal;
in response to a distance between the midpoint and either the first or second endpoint being less than or equal to a threshold distance, update the display of the viewport corresponding to a map of a second geographic area without updating the one or more shapes that display the indication of network coverage quality; or
in response to the distance between the midpoint and either the first or second endpoint being greater than the threshold distance, update the display of the viewport corresponding to a map of a third geographic area and updating the one or more shapes that display the indication of network coverage quality.

10. The apparatus for network viewport data fetching of claim 9, wherein the instructions further cause the processor to:
determine a location of the mobile device, where the first geographic area displayed on the viewport represents the location of the mobile device.

11. The apparatus for network viewport data fetching of claim 9, wherein the instructions further cause the processor to:
determine a midpoint latitude and longitude.

12. The apparatus for network viewport data fetching of claim 9, wherein the midpoint is a first midpoint and the instructions further cause the processor to:
determine the first midpoint latitude and longitude; and
in response to the updating the display of the viewport corresponding to the map of the third geographic area and the updating of the one or more shapes that display the indication of network coverage quality, determine a second midpoint latitude and longitude.

13. The apparatus for network viewport data fetching of claim 9, wherein the instructions further cause the processor to:
determine the distance between the midpoint and the first and second endpoint; and
in response to the updating the display of the viewport corresponding to the map of the third geographic area and the updating of the one or more shapes that display the indication of network coverage quality, determine a distance between the midpoint and a third and fourth endpoint.

14. The apparatus for network viewport data fetching of claim 9, wherein the instructions further cause the processor to:
determine a zoom level of the viewport;
in response to the zoom level being greater than a predetermined level, set the threshold distance at one-quarter of the distance of the diagonal; or
in response to the zoom level being less than or equal to the predetermined level, set the threshold distance at one-third of the distance of the diagonal.

15. The apparatus for network viewport data fetching of claim 9, wherein the instructions further cause the processor to:
determine, based on each of the one or more layered shapes, a maximum reference signal received power (RSRP) represented by a first layered shape;
determine, based on each of the one or more layered shapes, a minimum RSRP represented by a second layered shape; and
determine, based on each of the one or more layered shapes, an average RSRP of the one or more layered shapes.

16. The apparatus for network viewport data fetching of claim 15, wherein the instructions further cause the processor to:
update the display of the viewport to include an informational bar that displays the maximum RSRP, the minimum RSRP, and the average RSRP.

17. A non-transitory computer readable medium having instructions stored thereon that, when executed by a processor, cause an apparatus to:
receive a request at a mobile device to launch a network visualization application;

cause a graphical user interface (GUI) to be output by a user interface (UI), the GUI comprising:
  a display of a viewport corresponding to a map of a first geographic area and layered over the first geographic area one or more shapes that display an indication of network coverage quality;
determine a latitude and longitude of a first endpoint at a corner of the viewport and a second endpoint at an opposing corner of the viewport;
determine a distance of a diagonal extending from the first endpoint to the second endpoint;
determine a midpoint of the diagonal;
in response to a distance between the midpoint and either the first or second endpoint being less than or equal to a threshold distance, update the display of the viewport corresponding to a map of a second geographic area without updating the one or more shapes that display the indication of network coverage quality; or
in response to the distance between the midpoint and either the first or second endpoint being greater than the threshold distance, update the display of the viewport corresponding to a map of a third geographic area and updating the one or more shapes that display the indication of network coverage quality.

18. The non-transitory computer readable medium of claim 17, wherein the instructions further cause the processor to:
  determine a location of the mobile device, where the first geographic area displayed on the viewport represents the location of the mobile device.

19. The non-transitory computer readable medium of claim 17, wherein the instructions further cause the processor to:
  determine a midpoint latitude and longitude.

20. The non-transitory computer readable medium of claim 17, wherein the midpoint is a first midpoint, and the instructions further cause the processor to:
  determine the first midpoint latitude and longitude; and
  in response to the updating the display of the viewport corresponding to the map of the third geographic area and the updating of the one or more shapes that display the indication of network coverage quality, determine a second midpoint latitude and longitude.

* * * * *